(12) United States Patent  (10) Patent No.: US 7,433,760 B2
Alvarez et al.  (45) Date of Patent: Oct. 7, 2008

(54) CAMERA AND ANIMATION CONTROLLER, SYSTEMS AND METHODS

(75) Inventors: Donald Alvarez, Woodinville, WA (US); Mark Parry, Huntington Beach, CA (US)

(73) Assignee: Accelerated Pictures, Inc., Redmond, WA (US)

( * ) Notice: Subject to any disclaimer, the term of this patent is extended or adjusted under 35 U.S.C. 154(b) by 377 days.

(21) Appl. No.: 11/261,441

(22) Filed: Oct. 28, 2005

(65) Prior Publication Data

US 2006/0106494 A1  May 18, 2006

Related U.S. Application Data

(60) Provisional application No. 60/623,415, filed on Oct. 28, 2004, provisional application No. 60/623,414, filed on Oct. 28, 2004.

(51) Int. Cl.
  *G05B 19/04* (2006.01)
  *G05B 19/18* (2006.01)
  *H04N 5/232* (2006.01)
  *B60Q 1/124* (2006.01)
(52) U.S. Cl. .................. 700/251; 700/59; 700/65; 700/257; 348/211.8; 348/211.13; 362/233
(58) Field of Classification Search .............. 700/56, 700/57, 59, 61, 62, 64, 65, 251, 259; 348/207.99, 348/207.1, 207.11, 208.99, 208.1–208.7, 348/211.8, 211.13, 135; 352/53; 362/233; 382/103
See application file for complete search history.

(56) References Cited

U.S. PATENT DOCUMENTS 3,574,954 A  4/1971  Skolnick 5,032,842 A * 7/1991 Tanigaki et al. .............. 342/182
5,129,044 A * 7/1992 Kashiwagi et al. .......... 700/251

(Continued)

FOREIGN PATENT DOCUMENTS

WO  WO 2006/024078  3/2006

OTHER PUBLICATIONS

Schneck, P.B., "Persistent Access Control to Prevent Piracy of Digital Information," Proceedings of the IEEE, vol. 87, Issue 7, Jul. 1999, pp. 1239-1250.

(Continued)

*Primary Examiner*—Crystal Barnes Bullock
(74) *Attorney, Agent, or Firm*—Townsend and Townsend and Crew, LLP

(57) ABSTRACT

Embodiments of the invention provide novel controllers for filmmaking and/or animation, as well as systems and methods for their use. In a set of embodiments, a controller has an actuator (e.g., a joystick, etc.) that receives input from a user for controlling an object, such as a camera, a light, an animated character, etc. The input is provided as instructions, which are described according to a reference coordinate system, to a movement system for moving the object within a scene (i.e., relative to other objects within the scene). The controller may include an additional control allowing the user to define an auxiliary coordinate system, such that the input from the user is described according to the auxiliary coordinate system. Alternatively and/or additionally, the controller includes a control for allowing the user to select whether input should be described according to the auxiliary coordinate system or the reference coordinate system.

46 Claims, 14 Drawing Sheets

U.S. PATENT DOCUMENTS

| | | | |
|---|---|---|---|
| 5,268,996 A | 12/1993 | Steiner et al. | |
| 5,617,515 A | 4/1997 | MacLaren et al. | |
| 5,644,722 A | 7/1997 | Miyamoto et al. | |
| 5,658,238 A | 8/1997 | Suzuki et al. | |
| 5,752,244 A | 5/1998 | Rose et al. | |
| 5,764,276 A | 6/1998 | Martin et al. | |
| 5,764,980 A | 6/1998 | Davis et al. | |
| 5,790,124 A | 8/1998 | Fischer et al. | |
| 5,864,404 A * | 1/1999 | Amorosi | 356/627 |
| 5,909,218 A | 6/1999 | Naka et al. | |
| 5,921,659 A * | 7/1999 | Hunt et al. | 362/233 |
| 6,005,548 A | 12/1999 | Latypov et al. | |
| 6,058,397 A | 5/2000 | Barrus et al. | |
| 6,084,590 A | 7/2000 | Robotham et al. | |
| 6,199,082 B1 | 3/2001 | Ferrel et al. | |
| 6,219,045 B1 | 4/2001 | Leahy et al. | |
| 6,222,551 B1 | 4/2001 | Schneider et al. | |
| 6,222,560 B1 | 4/2001 | Naka et al. | |
| 6,268,864 B1 | 7/2001 | Chen et al. | |
| 6,278,466 B1 | 8/2001 | Chen | |
| 6,329,994 B1 | 12/2001 | Gever et al. | |
| 6,377,257 B1 | 4/2002 | Borrel et al. | |
| 6,414,684 B1 | 7/2002 | Mochizuki et al. | |
| 6,538,651 B1 | 3/2003 | Hayman et al. | |
| 6,546,405 B2 | 4/2003 | Gupta et al. | |
| 6,557,041 B2 | 4/2003 | Mallart | |
| 6,559,845 B1 | 5/2003 | Harvill et al. | |
| 6,609,451 B1 | 8/2003 | Inoue et al. | |
| 6,646,643 B2 | 11/2003 | Templeman | |
| 6,697,869 B1 | 2/2004 | Mallart et al. | |
| 6,738,065 B1 | 5/2004 | Even-Zohar | |
| 6,757,432 B2 | 6/2004 | Hijiri et al. | |
| 6,760,010 B1 | 7/2004 | Webb | |
| 6,806,864 B2 | 10/2004 | Rahn et al. | |
| 6,898,484 B2 | 5/2005 | Lemelson et al. | |
| 6,947,044 B1 | 9/2005 | Kulas | |
| 7,245,741 B1 * | 7/2007 | Ertl et al. | 382/103 |
| 7,266,425 B2 * | 9/2007 | Bhatt et al. | 700/251 |
| 7,347,780 B1 * | 3/2008 | Best | 463/37 |
| 2001/0007452 A1 | 7/2001 | Naka et al. | |
| 2001/0051535 A1 | 12/2001 | Kamimura et al. | |
| 2002/0089506 A1 | 7/2002 | Templeman | |
| 2002/0138843 A1 | 9/2002 | Samaan et al. | |
| 2002/0167518 A1 | 11/2002 | Migdal et al. | |
| 2002/0175994 A1 * | 11/2002 | Sakakibara et al. | 348/135 |
| 2002/0186221 A1 | 12/2002 | Bell | |
| 2003/0047602 A1 | 3/2003 | Iida et al. | |
| 2003/0080978 A1 | 5/2003 | Navab et al. | |
| 2003/0090523 A1 | 5/2003 | Hayashi et al. | |
| 2003/0137516 A1 | 7/2003 | Harvill et al. | |
| 2004/0001064 A1 | 1/2004 | Boyd et al. | |
| 2004/0061781 A1 * | 4/2004 | Fennell et al. | 348/169 |
| 2004/0114786 A1 * | 6/2004 | Cannon et al. | 382/127 |
| 2004/0119716 A1 | 6/2004 | Park et al. | |
| 2004/0131241 A1 * | 7/2004 | Curry et al. | 382/133 |
| 2004/0167924 A1 | 8/2004 | Kuroki | |
| 2004/0179013 A1 | 9/2004 | Menache | |
| 2004/0181548 A1 | 9/2004 | Thomas et al. | |
| 2004/0189702 A1 | 9/2004 | Hlavac et al. | |
| 2004/0252123 A1 | 12/2004 | Estrada et al. | |
| 2004/0263476 A1 | 12/2004 | Lim et al. | |
| 2005/0225552 A1 | 10/2005 | Anand | |
| 2005/0248577 A1 | 11/2005 | Birdwell | |
| 2006/0036162 A1 | 2/2006 | Shahidi et al. | |
| 2006/0074517 A1 | 4/2006 | Bhatt et al. | |
| 2006/0106494 A1 | 5/2006 | Alvarez et al. | |
| 2006/0109274 A1 | 5/2006 | Alvarez et al. | |
| 2006/0140507 A1 * | 6/2006 | Ohki | 382/276 |
| 2008/0024615 A1 | 1/2008 | Alvarez et al. | |
| 2008/0028312 A1 | 1/2008 | Alvarez et al. | |

OTHER PUBLICATIONS

Uczekaj, J. et al., "Tailoring Configuration Management Tools for Development of Avionics Software," Proceedings of the IEEE/AIAA/NASA 9th Digital Avionics Systems Conference, Oct. 15-18, 1990, pp. 493-498.

U.S. Appl. No. 11/262,492, Office Action dated Jan. 28, 2008, 37 pages.

* cited by examiner

CAMERA AND ANIMATION CONTROLLER, SYSTEMS AND METHODS

CROSS-REFERENCE TO RELATED APPLICATIONS

The present disclosure may be related to the following commonly assigned applications/patents:

This application claims priority from co-pending U.S. Provisional Patent Application No. 60/623,414 filed Oct. 28, 2004 by Alvarez et al. and entitled "Client/Sever-Based Animation Software."

This application also claims priority from co-pending U.S. Provisional Patent Application No. 60/623,415 filed Oct. 28, 2004 by Alvarez et al. and entitled "Control Having Interchangeable Coordinate Control Systems."

This application is also related to co-pending U.S. patent application Ser. No. 11/262,492, filed on Oct. 28, 2005 by Alvarez et at. and entitled "Client/Server-Based Animation Software, Systems and Methods".

The respective disclosures of these applications/patents are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates to the field of animation and filmmaking in general and, in particular, to software, systems and methods for filming, creating and/or editing animations and/or films, including without limitation controllers for controlling physical and/or virtual cameras.

BACKGROUND OF THE INVENTION

In filmmaking (either virtual, such as in an animated film, or real, such as in a live-action film), when an operator uses a control system to manipulate objects such as a camera, light, character, or similar object, the control system defines a coordinate system (or reference frame) for manipulating the position and orientation of the object. The choice of reference frame has significant impact on the cognitive effort required on the part of the operator to perform a desired movement.

Consider, for example, the common two dimensional coordinate systems known as a Cartesian coordinate system and a polar coordinate system. An example of a device for drawing that is controlled by a Cartesian coordinate system is the well known children's toy Etch-a-Sketch™, which has two dials, one for moving a cursor in a vertical direction and the other for moving a cursor in a horizontal direction. An example of a device for drawing that is controlled by a polar coordinate system is an adjustable drafting compass.

Notice that drawing a square using the Etch-a-Sketch™ toy is trivial, but that drawing a circle with this toy is exceedingly difficult (if not impossible) for a human operator. Although perhaps a computerized input control could cause a decent circle to be drawn, the point is that a human operator would find this difficult. By contrast, by using an adjustable drafting compass, a human operator can easily draw a circle, as well as other movements attuned to polar coordinates. Notably, the square that was trivial in the Cartesian coordinate system would be exceedingly difficult to draw using the compass.

Actually, a more appropriate device for polar movements is a drafting table with a hold in the drafting surface through which a string passes. If the string is attached to a pen and can be pulled from below the table, changes along a radial axis with constant angle can be done by pulling or releasing the string, while movements along an angular axis with constant radius can be made by moving the peen while keeping the string taut.

Naturally, in order to use this device to easily draw a circle with a different center, the fixed point of the string (if not a hold) must move over the drafting surface. Likewise, in order to draw a rotated square, the Cartesian coordinate system should rotate. In general, the ease of controlling movement or transitions in a space can depend on the type of coordinate system and the orientation (e.g., origins, axis directions, etc.) and on the ability to change orientations.

It is instructive to consider the problem related to cameras. Common translation coordinate systems used for camera control individually include camera relative coordinates, world relative coordinates, and crane relative coordinates. For example, in first-person video games, the most common coordinate system is camera relative coordinates. The scene portrayed in the game typically is a camera that moves with a controlled character in the game.

On a scene, such as a stage, world relative coordinates can be used. The user moves the camera relative to a reference point on the stage to obtain the desired view of an action on the scene.

Crane relative coordinates are typically associated with skilled motion picture camera operators. Specifically, by manipulating a crane with a top mounted camera, the best view of a scene may be taken and maintained.

In many cases, the choice of coordinates system has a major impact on the cognitive effort required by the programmer or artist in order to perform a desired object movement, whether this movement is real or virtual. This cognitive effort is particularly relevant to optical transceivers, such as cameras and light sources.

Simply stated, in the case of a camera, the operator must concentrate on both the composition of images being recorded and the path of movement of the camera. Two common examples can illustrate this phenomenon.

Camera relative translation coordinates greatly complicate the task of moving the camera along an arbitrary (straight) line path that is not coincident to the axis of the camera. This is especially true if the camera is panning to aim at a fixed target while moving along the arbitrary (straight) line path. On the other hand, world relative translation coordinates greatly simplify the same task—the direction of movement is defined using the world relative coordinates. When using world relative coordinates, then, during the movement, the camera operator can keep the camera panned at the fixed target (generally through the use of an additional panning control).

In contrast, world relative coordinates complicate the task of following behind an arbitrarily moving target where the camera is aimed. For example, assume that a character has motion across a scene in an action that is not coincident to any of the world relative coordinates and constantly and irregularly changes motion relative to those world relative coordinates. Using world relative coordinates, following the character is difficult at best. On the other hand, camera relative coordinates greatly simplify the same task. All the camera operator has to do is follow the character with reference to the camera image.

Certain other coordinates systems, such as "Crane Axes" may constrain the operator to performing a class of movements which is difficult to describe in Cartesian coordinates but which is stylistically familiar to viewers of a certain type of movie or television show. Camera operators spend many years learning these motions; they become second nature.

It is to be emphasized that this is not a case of a system being user friendly. It is rather a case of making the system adaptable to that particular coordinate system in which the operator is capable of conceiving with conservation of cognitive effort. In many cases, even with the most experienced of camera operators, it is an impossible complication for those camera operators to operate in camera movement coordinate systems that are not compatible with their "on the set" current thinking.

Definition of Terms

Certain terms, as used in this disclosure, have the following defined meanings:

Object. Something that either moves or can be moved relative to a reference coordinate system. The word includes optical transceivers, cameras, lights, characters, and props capable of movement or being moved relative to a reference coordinate system.

Optical transceiver. A system that either receives or transmits light. It includes a light receiving implement such as a camera, either real or virtual, which typically receives and/or projects light along an axis.

Camera. A device that converts light from real world or virtual images into either chemically collected images and/or electrically collected images for animation or real world recorded images. Camera is not intended to restrict the domain of these claims to real or virtual cameras. In particular, this term applies to cameras and other viewing applications in the control of characters, avatars, or other objects in video games.

Light. A device that projects light on to real world or virtual characters, props, or scenes for providing illumination to the ultimately produced and collected images. Typically, the light has a source, a solid angle of propagation, intensity, and color.

Object relative coordinates. These coordinates can be optical transceiver relative, camera relative, light relative, or object relative coordinates: These systems provide controls which move "Forward/Back," "Right/Left," and "Up/Down," all defined relative to a current orientation. In the case of the optical transceiver, camera, or light, the current orientation is the axis of light transmission or reception. In the case of an object, the current orientation is usually the "front" or normal direction of motion. For example, this would be the bow in the case of a ship, the head in the case of a human or animal, etc.

World relative coordinates. These systems provide controls which move "North/South," "East/West," and "Up/Down," all defined using directions external and independent of orientation. Within the category of "World" coordinate systems, it is possible to define an infinite number of "World" reference frames which differ only in the orientation of the coordinate axes. Using the "North/South/East/West" terminology, it is possible to define "North" using the magnetic North pole of the Earth, using the spin axis of the Earth, using the major axis of a rectangular room, and/or using any other definition which is convenient for the system or operator, even if it does not align with any conventional definition of "North."

Crane Axes coordinates (or Forward Kinematic coordinates). These systems provide controls which rotate individual joints in a segmented crane or robotic arm (thereby moving the end of the crane or arm in some way).

Motorized Track. These systems provide controls which move along a physically constructed (and often curved) track.

Rotation Coordinate Systems. The variety of rotation coordinate systems used for causing rotation space relative to an axis.

Model. A three-dimensional shape, usually described in terms of coordinates and mathematical data, describing the shape of any character or object. Examples of characters include actors, animals, or other beings whose animation can tell or portray the story. In the usual case, the model is typically provided in a neutral pose (known in the art as a "da Vinci pose"), in which the model is shown standing with limbs spread apart and head looking forward. It is understood in the art that in, many situations, the generation of the model can be extraordinarily expensive. In some cases, the model is generated, scanned or otherwise digitized with recorded spatial coordinates of numerous points on its surface. A virtual representation of the model can occur when the data is reconstructed. Furthermore, the model may include connectivity data, such that the collection of points defining the model can be treated as the vertices of polygonal approximations of the surface shape of the model. The model may include various mathematical smoothing and/or interpolation algorithms. Such models can include collections of spatial points ranging from hundreds of points to hundreds of thousands or more points.

Render. To make a model viewable as an image, such as by applying textures to a model and/or imaging the model using a real or virtual camera or by photographing a real object.

Rig. In general, the term "rig" is used to refer to a physics engine that specifies how movement of the model should translate into animation of a character based on the model. This is the software and data used to deform or transform the "neutral pose" of the model into a specific "active pose" variation of the model. Taking the example of the human figure, the rig would impart to the model the skeletal joint movement including shoulder, elbow, hand, finger, neck, head, hip, knee, and foot movement by way of example. By having animation software manipulate a rig incorporated to a model, animated movement of the model is achieved.

Texture. In the usual modern case, "texture coordinates" are mapped onto the surface of a model to provide a digital image portrayed by the model as manipulated by the rig.

Virtual Character. The model as deformed by the rig and presented by the texture in animation.

Virtual Set. The vicinity or fiducial reference point and coordinate system with respect to which the location of any element may be specified.

Prop. An object on the virtual set usually comprising a model without a rig.

Scene. A virtual set, one or more props, and one or more virtual characters.

Action. Animation associated with a scene. It should be noted that upon editing of the final animation story, portions of an action may be distributed without regard to time for example at the beginning, middle and end of the animation story.

Editing. The process by which portions of actions are assembled to construct a story, narrative, or other product.

Actuator. A device such as a mouse or keyboard on a personal computer enabling input to the animation software. This term includes our novel adaptation of a "game controller" for imparting animation to characters.

BRIEF SUMMARY OF THE INVENTION

Embodiments of the invention provide novel controllers for filmmaking and/or animation, as well as systems and methods for their use. In a set of embodiments, a controller has an actuator (e.g., a joystick, etc.) that receives input from a user for controlling an object, such as a camera, a light, an animated character, etc. The input is provided as instructions, which are described according to a reference coordinate system, to a movement system for moving the object within a scene (i.e., relative to other objects within the scene). The controller may include an additional control allowing the user to define an auxiliary coordinate system, such that the input from the user is described according to the auxiliary coordinate system. Alternatively and/or additionally, the controller includes a control for allowing the user to select whether input should be described according to the auxiliary coordinate system or the reference coordinate system.

Merely by way of example, one set of embodiments provides systems for moving an object (which can be a real object, such as an optical transceiver—including without limitation a camera and/or a light—a tool, a manned or unmanned vehicle, a flying camera platform, etc., or a virtual object, such as a virtual camera, an animated character, an object in a virtual scene, etc.). An exemplary control system for a mechanical, electronic and/or virtual digital system might control at least a location of an object in a two-dimensional surface or three-dimensional space, perhaps based on human user input specifying movement according to a coordinate system. One such control system comprises user inputs (e.g., one or more controllers, etc.) for receiving location changes specified according to a first coordinate system (which might be a reference coordinate system in some embodiments). In some cases, the control system further comprises a movement system configured to move the object according to the location changes specified in the first coordinate system.

The exemplary system further comprises user inputs (which may be incorporated in the one or more controllers) for changing from the first coordinate system to a second coordinate system (e.g., an auxiliary coordinate system, etc.) and/or logic for operating the movement system in the second coordinate system when the user inputs specify a change in coordinate systems. Additionally and/or alternatively, the control system can further comprise user inputs for specifying one or more conversions between the first and second coordinate systems. In a set of embodiments, the user inputs specify location changes in a current coordinate system, selected among the first and second coordinate systems, according to a coordinate system input. In another set of embodiments, the user inputs include dimensional subcomponents such that each subcomponent allows a user to independently specify movement along an independent axis of the current coordinate system.

Another exemplary system for moving an object comprises a controller configured to receive input from a user and, based on the received input, provide instructions to a movement system for moving the object relative to at least one other object within a scene; the input may be described according to an auxiliary coordinate system. The system may further comprise a movement system configured to move the object according to the instructions, as well as logic to allow the user of the controller to define a set of controller axes defining the auxiliary coordinate system. In some cases, there is also logic to translate the input from the auxiliary coordinate system to the reference coordinate system before providing the input as instructions to the movement system according to a reference coordinate system.

In a set of embodiments, the logic can further allow the user to define a second set of controller axes defining a second auxiliary coordinate system and/or to allow the user to toggle between the reference coordinate system and one or more auxiliary coordinate systems. (The reference coordinate system may be defined by a second set of controller axes.) In some cases, the set of controller axes may be defined while the object is moving. In other cases, the controller axes may be defined by a current position and/or orientation of the object. Coordinate systems that may be used in various embodiments include, without limitation, world relative coordinates, object relative coordinates, crane axes relative coordinates, motorized track relative coordinates, and rotation system coordinates. In a particular embodiment, one controller axis may describe an arbitrary mathematical function of space and/or space and time, such as a curved line, etc. In certain embodiments, two reference systems might share a common axis, which might describe an arbitrary mathematical functions of space and/or space and time, such as a curved line, etc.

In a set of embodiments, the system further comprises a storage medium. Hence, there can be logic for recording actuator movement (and/or inputs based on that movement), object movement (and/or instructions for such movement), and/or various coordinate systems.

The controller may comprise any of a variety of devices, including a mouse, keyboard, joystick, steering wheel (and/or other vehicle controls), a full and/or partial body motion capture unit (including without limitation an optical, mechanical or electromagnetic system configured to capture the position or motion of an actor, puppet or prop), an inertial control system, an optical control system, and/or the like. In some cases, the controller will comprise an actuator (such as a joystick, etc.), which can be manipulated to provide input. In some cases, the controller will comprise a plurality of actuators. In some cases, there may be a second movement system (which might, for example, orient a view of an optical transceiver), and one of the actuators might provide input for the first movement system, while a second actuator provides input for the second movement system.

Another exemplary system for moving an object comprises a controller configured to receive input from a user and, based on the received input, provide instructions to a movement system for moving the object relative to at least one other object within a scene. The system further comprises a movement system configured to move the object according to the instructions. The system can, in some cases, include logic to allow the user of the controller to toggle between a reference coordinate system and an auxiliary coordinate system, such that the user input is described according to either the reference coordinate system or the auxiliary coordinate system. In other cases, further logic translates the input from the user as necessary from the auxiliary coordinate system to the reference coordinate system, such that the instructions are provided to the movement system according to the reference coordinate system.

Yet another exemplary system comprises a controller and a movement system (such as those described above), as well as a computer in communication with the controller and the movement system. The computer comprises a processor and a set of instructions including instructions executable by the processor to receive the input from the controller, instructions executable by the processor to allow the user to define a set of controller axes defining the auxiliary coordinate system, instructions to translate the input from the auxiliary coordinate system to the reference coordinate system, and/or instructions based on the received input, provide movement instructions to a movement system, wherein the movement instructions are described according to the reference coordinate system.

Another set of embodiments provides methods, including without limitation methods of using any of the controllers and/or systems described above, as well as methods for moving objects. An exemplary method comprises receiving at a controller input from a user for moving an object relative to at least one other object within a scene; the input might be described according to an auxiliary coordinate system. The method may further comprise allowing the user of the controller to define a set of controller axes defining the auxiliary coordinate system and/or translating the input from the auxiliary coordinate system to a reference coordinate system. In some cases, the method comprises providing instructions to a movement system for moving the object, based on the translated input received from the user, such that the instructions are described according to the reference coordinate system. In some cases, the method comprises moving the object and/or allowing the user to toggle between the reference coordinate system and the auxiliary coordinate system.

Another exemplary method comprises receiving at a controller input from a user for moving an object relative to at least one other object within a scene and allowing the user of the controller to toggle between a reference coordinate system and an auxiliary coordinate system, such that when the user selects the reference coordinate system, the input is described according to the reference coordinate system, and when the user selects the auxiliary coordinate system, the input is described according to the auxiliary coordinate system. If necessary, the input received from the user may be translated from the auxiliary coordinate system to the reference coordinate system. The method then, can further include providing instructions to a movement system for moving the object, based on the input received from the user, such that the instructions are described according to the reference coordinate system.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

Figure 1B:
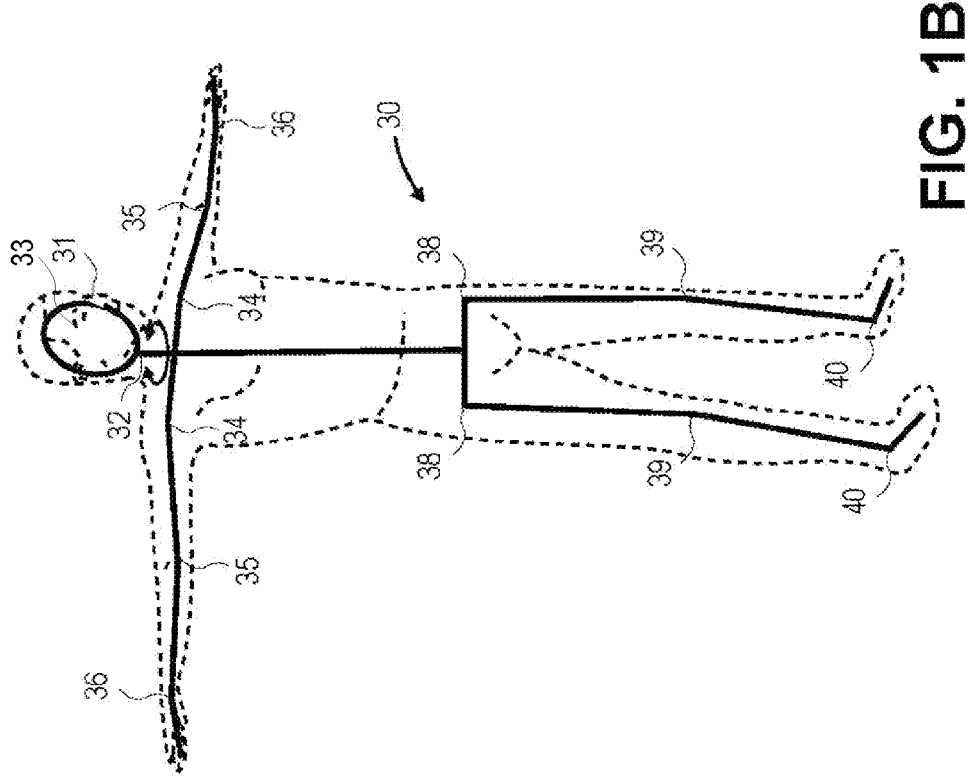
FIG. 1B is a schematic of a rig for articulating the model of FIG. 1A.

Embodiments of the invention provide novel controllers for filmmaking and/or animation, as well as systems and methods for their use. In a set of embodiments, a controller has an actuator (e.g., a joystick, etc.) that receives input from a user for controlling an object, such as a camera, a light, an animated character, etc. The input is provided as instructions, which are described according to a reference coordinate system, to a movement system for moving the object within a scene (i.e., relative to other objects within the scene). The controller may include an additional control allowing the user to define an auxiliary coordinate system, such that the input from the user is described according to the auxiliary coordinate system. Alternatively and/or additionally, the controller includes a control for allowing the user to select whether input should be described according to the auxiliary coordinate system or the reference coordinate system.

Merely by way of example, in a particular embodiment, a camera operator might use a controller to move a camera on a movie set. The operator manipulates an actuator (which, in this example, might be a joystick) on the controller in order to move the camera. Initially, for instance, the controller is configured to receive input according to world relative coordinates. In other words, if the operator presses forward on the joystick, the controller interprets that as an instruction to move the camera North, relative to the set. (It should be noted that "North" may be true North or otherwise may defined differently relative to the set.) Likewise, if the operator presses left on the joystick, the controller interprets that input as instruction to move the camera West. The controller provides movement instructions to a movement system for the camera according to a reference coordinate system (which in this case is the world relative coordinate system, but which might be any appropriate coordinate system), and the movement system moves the camera according to the movement instructions.

In some cases, the controller comprises a control (such as a button, etc.) to allow the user to define an auxiliary coordinate system. Hence, in this example, the operator can press the relevant button on the controller to define an object relative coordinate system. Henceforth, when the operator presses forward on the joystick, the input will be interpreted as an instruction to move the camera forward (relative to the orientation of the camera), regardless of whether the camera is facing North. The controller (and/or a computer in communication therewith) translates the coordinate system describing the input to the coordinate system describing the instructions, such that the camera receives movement instructions in the reference coordinate system, regardless of the coordinate system describing the input).

In certain embodiments, multiple auxiliary coordinate systems (such as world relative coordinates, object relative coordinates, crane axes relative coordinates, motorized track relative coordinates, rotational coordinates, polar coordinates, etc.) may be defined in this manner.

The controller may comprise another control (which might be another button), which allows the operator to toggle between one or more auxiliary coordinate systems (which may be defined by the operator, as described above, or which may be pre-defined). Hence, for example, the operator may choose to operate in world relative coordinates for filming a certain portion of a scene, then toggle to crane axes relative coordinates for another portion of the scene, allowing the operator to choose the coordinate system that provides the desired camera movement while requiring the least cognitive effort on the part of the camera operator. The controller (and/or a computer in communication with the controller) translates the input to the controller as necessary before providing it as instructions, described according to the reference coordinate system, to the movement system.

In other embodiments, a controller may be used to control the movement of an object within an animated scene (such as an animated character, a virtual camera and/or light source, etc.). In particular embodiments, a controller may be used to render animated characters, perhaps using a client/server animation, such as that described in U.S. application Ser. No. 11/262,492, previously incorporated by reference. Merely by way of example, the controller may be used to define the movement of a model and/or rig for such a character.

It therefore is useful to provide a brief overview of the animation process. Referring to FIG. 1A, a model 10 the form of a human figure is disclosed. Model 10 includes face 11, neck 12, arms 14 with elbow 15 and wrist 16 leading to hand 17. The model further includes hip 18 knees 19 and ankles 20. In a virtual character, the "model" (or "virtual model") is a geometric description of the shape of the character in one specific pose (commonly called the "model pose," "neutral pose," or "reference pose." The neutral pose used in the model is commonly a variation on the so called "da Vinci pose" in which the model is shown standing with eyes and head looking forward, arms outstretched, legs straight with feet approximately shoulder width apart.

The model can be duplicated in any number of ways. In one common prior art process, a clay model or human model is scanned or digitized, recording the spatial coordinates of a numerous points on the surface of the physical model so that a virtual representation of the model may be reconstructed from the data. It is to be understood that such models can be the product of great effort, taking man years to construct.

The model also includes connectivity data (also called an "edge list"). This data is recorded at the time of scanning or inferred from the locations of the points, so that the collection of points can be treated as the vertices of a polygonal approximation of the surface shape of the original physical model. It is common, but not required, in the prior art for various mathematical smoothing and interpolation algorithms to be performed on the virtual model, so as to provide for a smoother surface representation than is achieved with a pure polygonal representation. One skilled in the art will appreciate that virtual models commonly include collections of spatial coordinates ranging from hundreds of points to hundreds of thousands or more points.

Figure 1A:
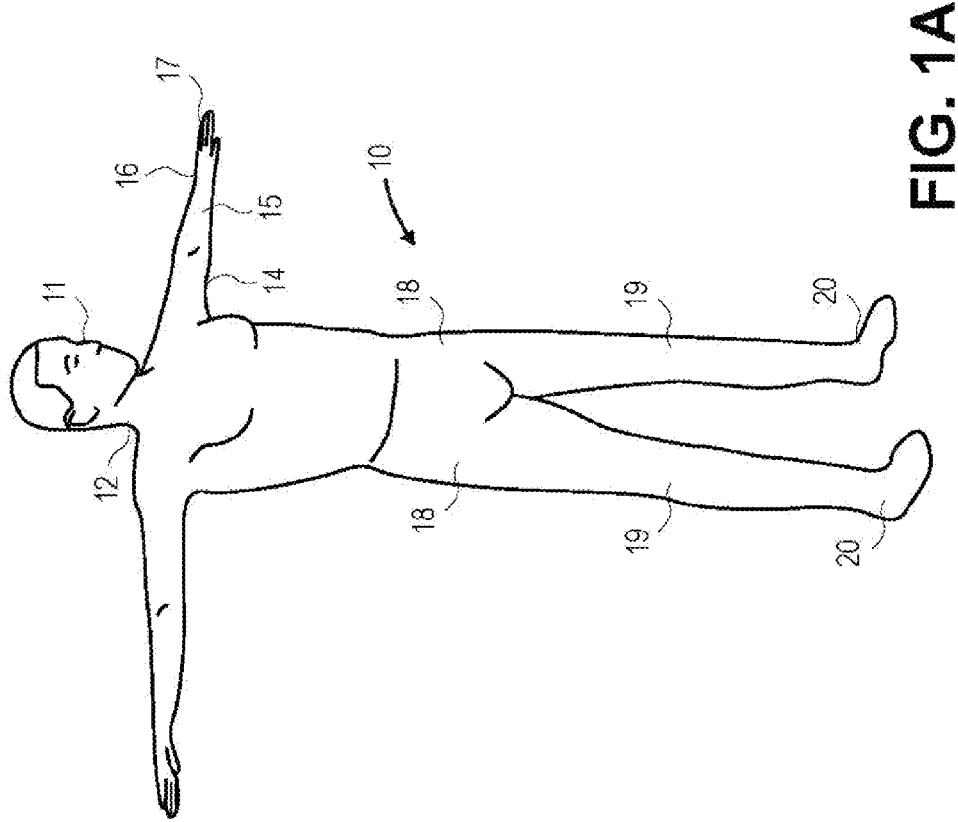
FIG. 1A is a schematic of a model, specifically, a model of a human figure, in a "da Vinci pose"

Referring to FIG. 1B, a rig 30 is illustrated which is compatible with model 10 shown in FIG. 4A. Rig 30 includes head 31, neck 32, eyes 33, shoulders 34 elbows 35 and wrist 36. Further, hips 38 knees 39 and ankles 40 are also disclosed. Simply stated rig 30 is mathematically disposed on model 10 so that animation can move the rig 30 at neck 32, shoulders 34 elbows 35 and wrist 36. Further, movement of hips 38, knees 39, and ankles 40 can also occur through manipulation of the rig 30.

The rig 30 enables the model 10 to move with realistic changes of shape. The rig 30 thus turns the model 10 into a virtual character commonly required to move and bend, such as at the knees or elbows, in order to convey a virtual performance. The software and data used to deform (or transform) the "neutral pose" model data into a specific "active pose" variation of the model is commonly called a "rig" or "IK rig" where ("IK" is a shortened form of "Inverse Kinematics").

"Inverse Kinematics" (as in "IK Rig") is a body of mathematics that enables the computation of joint angles (or joint rotations) from joint locations and skeletal relationships. "Forward Kinematics" is the term of art for computing joint locations based on a collection of joint angles and skeletal relationships.

To a programmer skilled in the art, a rig is a piece of software which has as its inputs a collection of joint rotations, joint angles and/or joint locations ("the right elbow is bent 30 degrees" or "the tip of the left index finger is positioned 2 cm above the center of the light switch"), the skeletal relationships between the joints ("the head bone is connected to the neck bone") and a neutral pose representation of the virtual model, and has as its output a collection of spatial coordinates and connectivity data describing the shape that the virtual actor's body takes when posed as described by the input data.

To an artist skilled in the prior art, a rig is a visual representation of the skeleton of the virtual actor, with graphical or other controls which allow the artist to manipulate the virtual actor. In the case of an "Inverse Kinematics Rig" the artist might place a mouse on the left index finger of the virtual actor and dragging the left index finger across the screen so as to cause the virtual actor's arm to extend in a pointing motion. In the case of a "Forward Kinematics Rig" the artist might click on the elbow of the virtual character and bend or straighten the rotation of the elbow joint by dragging the mouse across the screen or by typing a numeric angle on the keyboard.

Figure 1C:
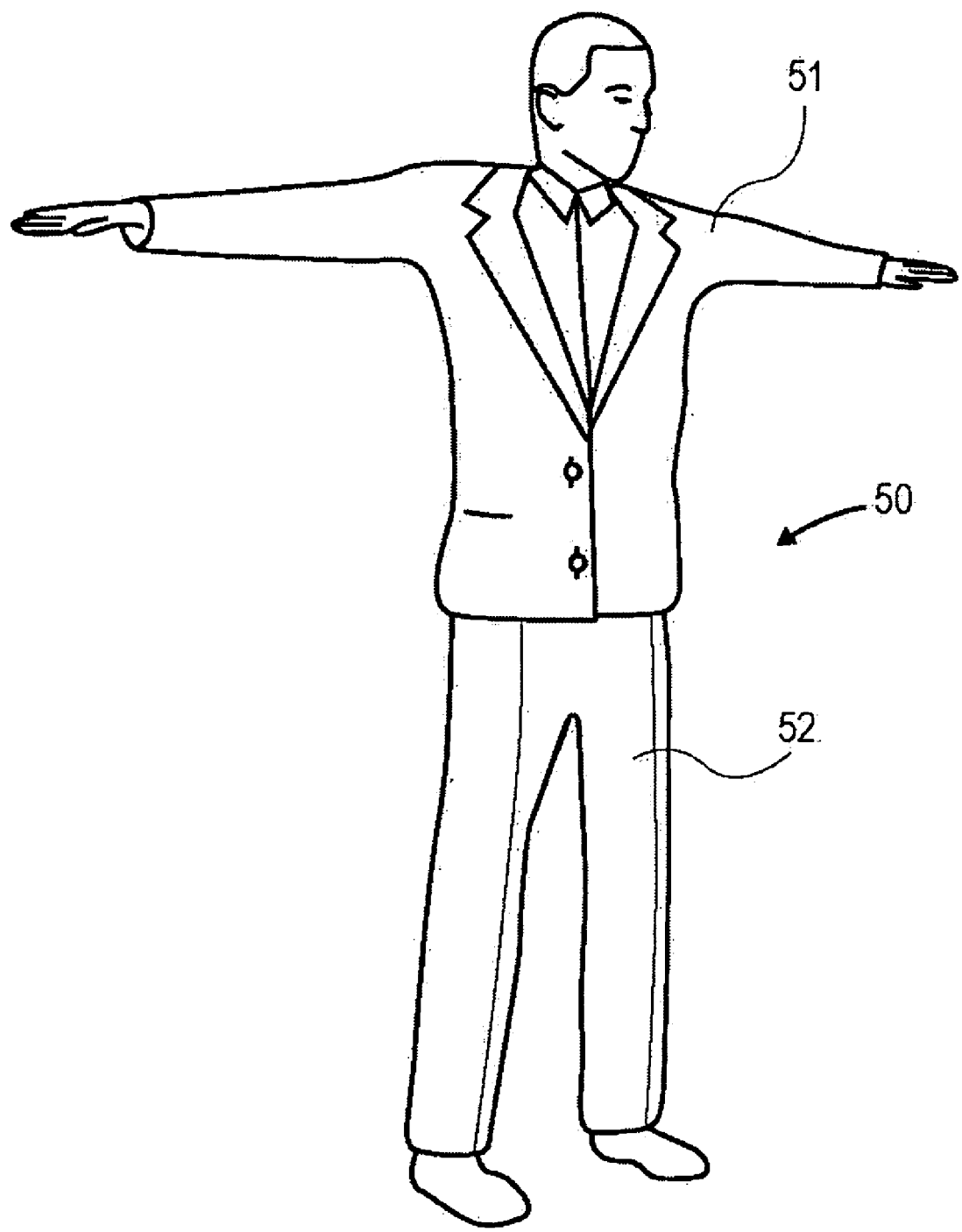
FIG. 1C is a schematic of the model having texture applied for movement by the rig.

Referring to FIG. 1C, texture 50 is illustrated here in the form of only a man's suit having a coat 51 and pants 52. In actual fact, texture 50 would include many other surfaces. For example, a human face, socks, shoes, hands (possibly with gloves) would all be part of the illustrated texture 50. It is common for a virtual actor to be drawn (or "rendered") to the screen with, for example, blue eyes and a red jacket. The virtual model described earlier contains purely spatial data. Additional data and/or software, commonly called "Textures," "Maps," "Shaders," or "Shading" is employed to control the colors used to render the various parts of the model.

In the earliest forms of the prior art, the color (or "texture") information was encoded directly into the model, in the form of a "Vertex Color." A Vertex Color is commonly an RGB triplet (Red 0-255, Green 0-255, Blue 0-255) assigned to a specific vertex in the virtual model. By assigning different RGB triplets to different vertices, the model may be colored in such a way as to convey blue eyes and a red dress.

While vertex colors are still used in the creation of virtual characters, in the current state of the art it is more common to make use of "texture coordinates" and "texture maps." "Texture coordinates" are additional data that is recorded with the vertex location data and connectivity data in order to allow an image (or "texture") to be "mapped" onto the surface.

In order to provide realistic coloring to the eyes of the virtual character (perhaps including veins in the whites of the eyes and/or color striations in the iris), a digital image of an eye will be acquired (possibly via a digital camera or possibly by an artist who paints such a picture using computer software). The digital image of the eye is a "texture map" (or "texture"). The vertices in the model that comprise the surface of the eye will be tagged with additional data ("texture coordinates") that is analogous to latitude and longitude coordinates on a globe. The texture is "mapped" onto the surface by use of the texture coordinates.

Referring back to FIG. 1B, the virtual character is instructed to look to the left (for example by rotating the neck controls 32 or eye controls 33 in the rig), the virtual model is deformed in a manner which rotates all of the vertices making up the head 11 to the left. The head texture is then rendered in the desired location on the screen based upon the vertex locations and the texture coordinates of those vertices.

Figure 2:
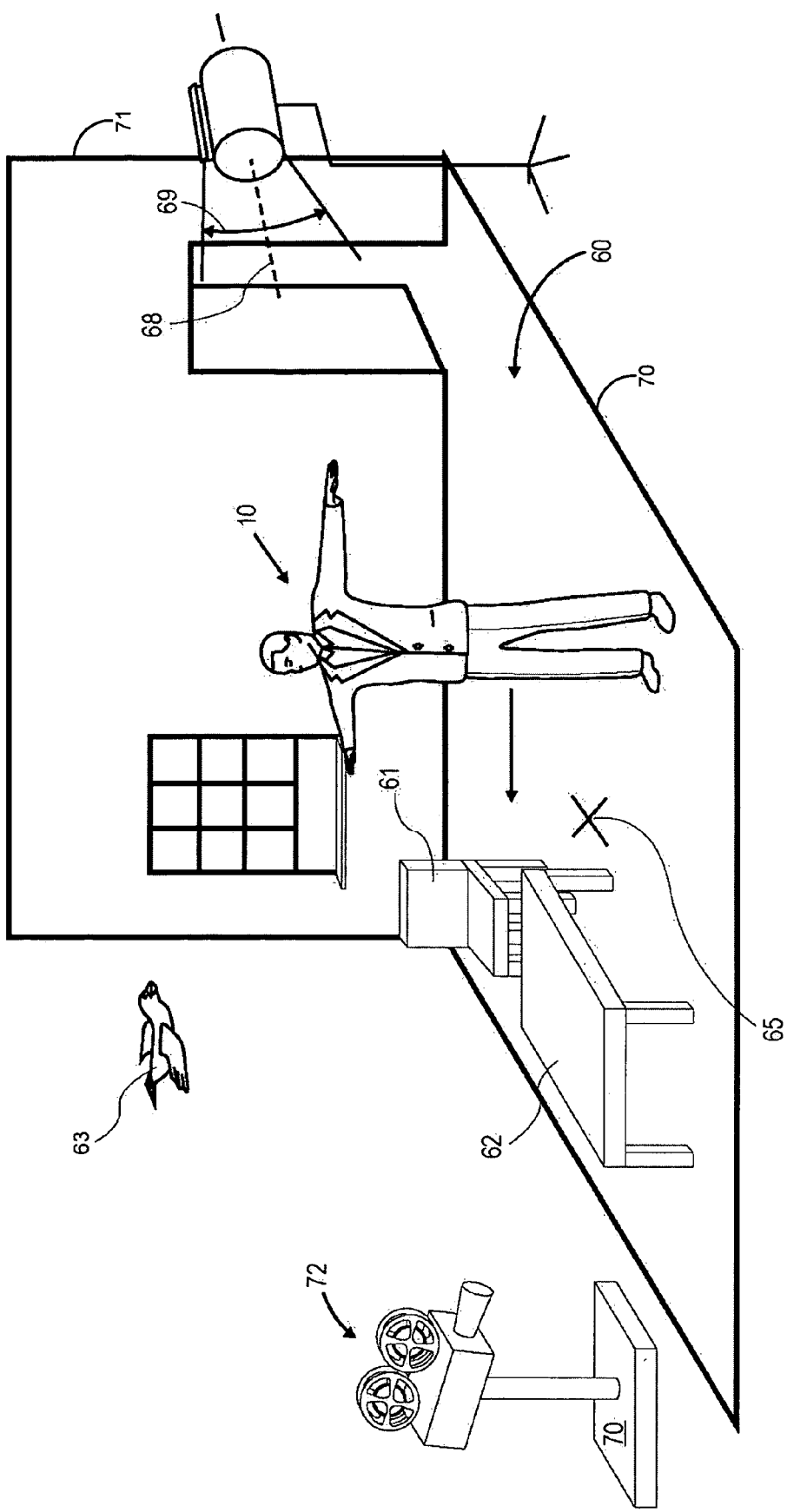
FIG. 2 is a schematic of a scene with props and characters placed thereon ready to produce an animated action.

Referring to FIG. 2, an animated scene comprises some or all of the following: a virtual set (set 60 being shown), one or more props (floor 70, wall 71, chair 61 and table 62 being shown), and one or more virtual characters (model 10 manipulated by rig 30 having texture 50 being shown [here designated only by the 10]).

Each of the virtual sets, props, and characters has a fiducial reference point with respect to which the location of the element may be specified. Here the fiducial reference point is shown at 65. The virtual set 60, props (see chair 61 and table 62), and character 10 are assembled together by specifying their spatial locations using a shared coordinate system from fiducial 65. The choice of coordinate system is arbitrary, but a common practice is to locate the virtual set at the origin of the coordinate system.

Often, the background (or "virtual set") is essentially a virtual character with either no rig (in the case of a purely static virtual set) or what is commonly a very simple rig (where the joint angles might control the opening angles of a door 67 or the joint locations might control the opening height of a window 68). It is common to embellish the scene used in an action with a variety of props. As with the background, props are again essentially virtual characters which are used to represent inanimate objects.

For the purposes of creating a motion picture sequence, animation data is associated with the elements of a scene to create an action. A sequence of images may be constructed by providing the rig of character 10 with a sequence of input data ("animation data") such as 24 sets of joint angles per second, so as to produce a 24 frame per second movie. In the prior art, the animation data provided to the rigs are commonly compressed through the use of various interpolation techniques.

For example, it is common in the prior art to compress the animation data into "key frames." A key frame is typically associated with a specific point in the timeline of the sequence of images ("t=2.4 seconds") and specifies joint angles or joint locations for some or all of the joints in the rig. Any joints (or more generally input parameters) whose values are not specified in this key frame interpolate their values at t=2.4 seconds from other preceding and following key frames that do specify values for those joints or input parameters. The various families of mathematical formulas used to interpolate between key frame values (such as "Bezier curves" and "b-Splines") are well known to practitioners of the art.

Several methods are commonly used by which artist specify the input data provided to the rig. Merely by way of example, in the "animation" method, the artist indicates a specific point in the timeline ("t=2.4 seconds"), adjusts one or more joint angles or locations (for example using the keyboard or by manipulating on-screen controls using a mouse), and "sets a key frame" on those joint angles or locations. The artist then moves to a different point on the timeline ("t=3.0 seconds") and again adjusts joint angles or locations before "setting a key frame."

Once the artist has set two or more key frames, the artist can move an indicator on the timeline or press a "play" button to watch the animation that she has created. By repeatedly adding, modifying, or moving key frames while repeatedly watching the playback of the animation, the artist can create the desired performance.

In the "motion capture," method the artist performs the motion in some manner while the computer records the motion. Common input devices for use with motion capture include a full-body suit equipped with sensing devices to record the physical joint angles of a human actor and so-called "Waldo" devices which allow a skilled puppeteer to control a large number of switches and knobs with their hands (Waldo devices are most commonly used for recording facial animations). It is common to perform multiple captures of the same motion, during which sequence of captures the actor repeatedly reenacts the same motions until data is collected which is satisfactory both artistically and technically.

In the "procedural" method, custom software is developed which generates animation data from high-level input data. Procedural animation is commonly used when animating non-human actors such as flocks of birds or falling rocks. In FIG. 2, bird 63 illustrates this technique.

In the "hybrid" method, the motion capture and/or procedural method is used to specify the initial data. For example, the initial movement of bird 63 would be used in the procedural method. The data obtained via the motion capture or procedural method is then compressed in a manner that makes it technically similar (or compatible with) data obtained via the animation method. For example, presuming that bird 63 was going to interact with character 10 in scene 60, modification of the procedural image of bird 63 would occur. Once the initial data has been compressed, it is then in the hybrid method manipulated, re-timed, and/or extended through the use of the animation method.

The animation software often plays back previously specified animations by interpolating animation data at a specific point in time, providing the interpolated animation data to the rigs, making use of the rigs to deform the models, applying textures to the models, and presenting a rendered image on the display. The animation software then advances to a different point in the timeline and repeats the process.

Based on this overview of the animation process, the following example describes a method of moving a camera relative to the scene illustrated by FIG. 2. (For ease of description, FIG. 2 is not described directly in this example, but one skilled in the art should appreciate, based on this disclosure, that by virtually replaying an action recorded on a scene such as that set forth in FIG. 2, the camera angles will constantly change relative to the main coordinate system 65 of FIG. 2. Likewise the lighting of the scene of FIG. 2 will not be described in detail, except to note that light 67 (here illustrated of the Fresnel variety) is illustrated with respect to the scene of FIG. 2. It should be understood by one of skill in the art that this light has an axis of projection 68, an intensity, and a solid angle of propagation 69. This will cause illumination of the scene of FIG. 2 and especially character 10.

It is to be understood that all movement of light 67 is analogous to corresponding movement of camera 72 mounted relative to moveable platform 70 with one main difference. Light 67 projects light; camera 72 receives light. And for animation purposes, the received light is the product sought; it is the real time recordation of the action that may ultimately be edited into the film product that is produced.

It will be further understood that for the most part, the light projected from light 67 is symmetrical with respect to axis 68. In this usual case, rotational coordinates as applied about axis 67 are not important. This not always the case, as where non symmetrical images such a Gobos, special effects, and the like are used with the invention. Rotation of camera 72, of course, may be important in many cases, and thus and will be discussed in detail.

Figure 3:
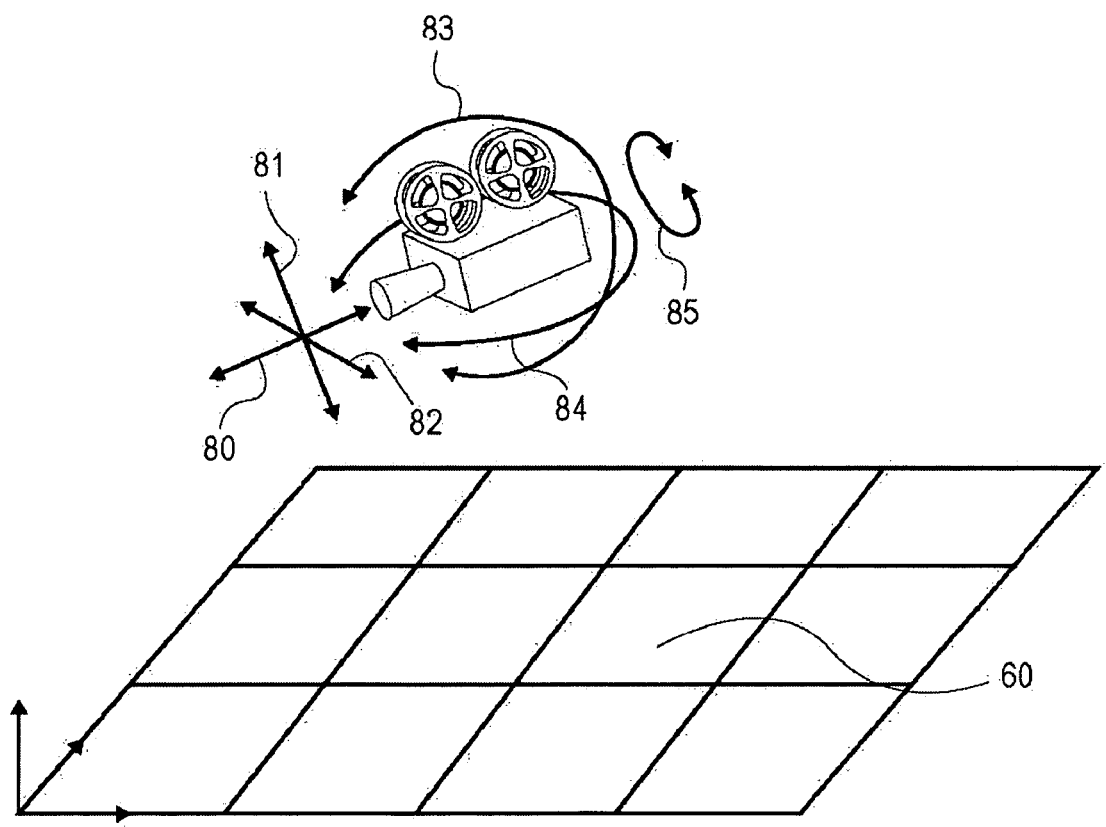
FIG. 3 is a depiction of a camera relative coordinate system illustrating camera movement relative to such a coordinate system.

Referring to FIG. 3, camera relative coordinates are illustrated. Camera axis 80 has camera displacement towards and away from the axis. Upward camera displacement occurs along axis 81, sidewise camera displacement occurs along axis 82. Thus, having the imaginary eye at the camera lens, such movement is relatively easy to understand.

Camera rotation is required. Upward and downward rotation occurs along rotational axes 83. Side to side rotation occurs along axes 84. Finally, camera roll can occur about camera axis 80 as illustrated in rotational axes 85.

In all, there are six degrees of freedom to described complete movement of camera 72 in FIG. 3 relative to the underlying scene—only partially shown—relative to FIG. 2.

Returning to FIG. 2, animation software will generate an action including movement of character 10 on the scene of FIG. 2. For the purposes of this discussion, we assume that the action is always the same. What is not the same is the camera movement. Animation software will relatively rotate the scene with respect to the camera to cause the final recorded image of the scene to come from the particular perspective to which the camera has been moved. So far, this is relatively easy to understand.

But now it must be remembered that someone must plan the movements relative to the already recorded action on the scene of FIG. 2. In this planning, it is required that the operator (programmer, artist, director, etc.) think ahead. In particular, the operator has to think about planning camera movement—as well as the ultimate image she wishes to capture. And in order to think clearly, she simply cannot be forced into mentally transforming coordinates for camera movement. It is a simple fact that most people cannot transform coordinates, if that is their only assigned task. But in the case of the operator, she is overwhelmed if coordinate transformation is required. Accordingly, embodiments of the invention can provide the operator with the most convenient coordinate system in which the operator can currently think. Once this is done, the coordinate task becomes largely transparent and the remaining (and considerably difficult) tasks of film production can get her sole attention.

Figure 4:
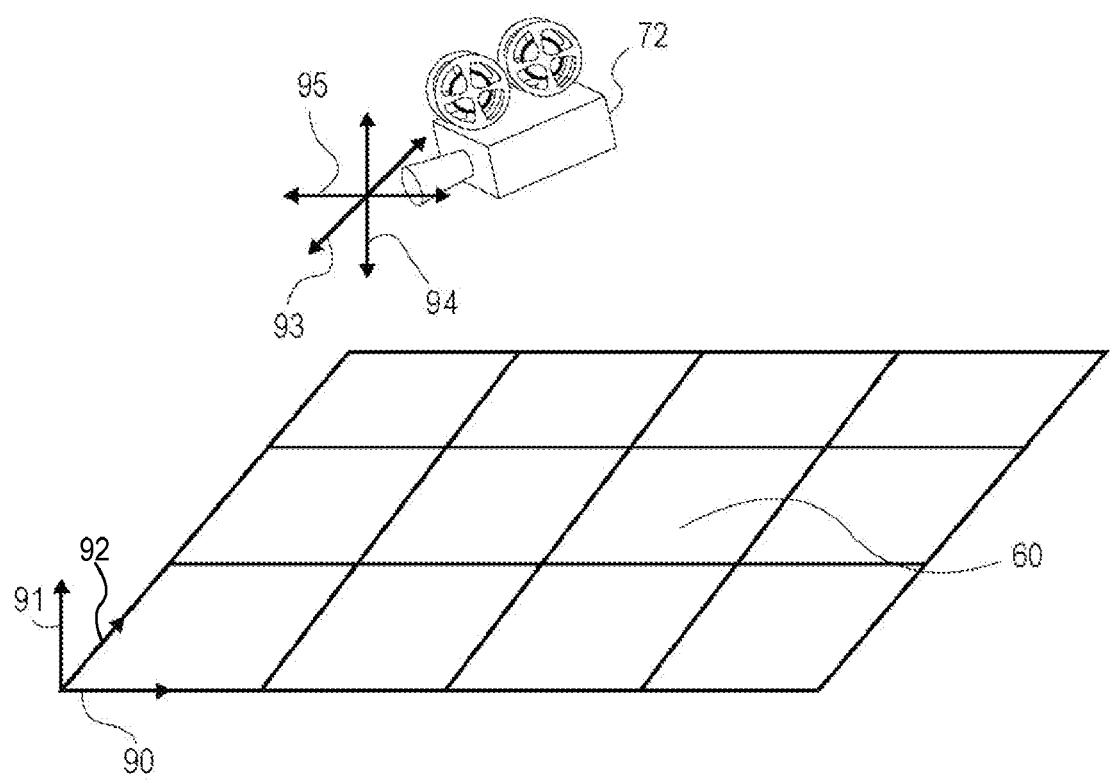
FIG. 4 is a depiction a of world relative coordinate system illustrating camera movement relative to such a coordinate system.

Referring to FIG. 4, real world coordinates are described—without reference to rotation (which will be separately discussed with respect to FIG. 7A-7D. Specifically, scene 60 has orthogonal coordinates 90 (x-axis), 91 (y-axis), and 92 (z-axis). The corresponding axes for camera motion are correspondingly parallel axes, x-axis 95, y-axis 94, and z-axis 93. Here, these axes happen to be parallel to those on the stage; this does not always have to be the case. Further, these axes happen to be orthogonal; this too does always not have to be the case.

Figure 5:
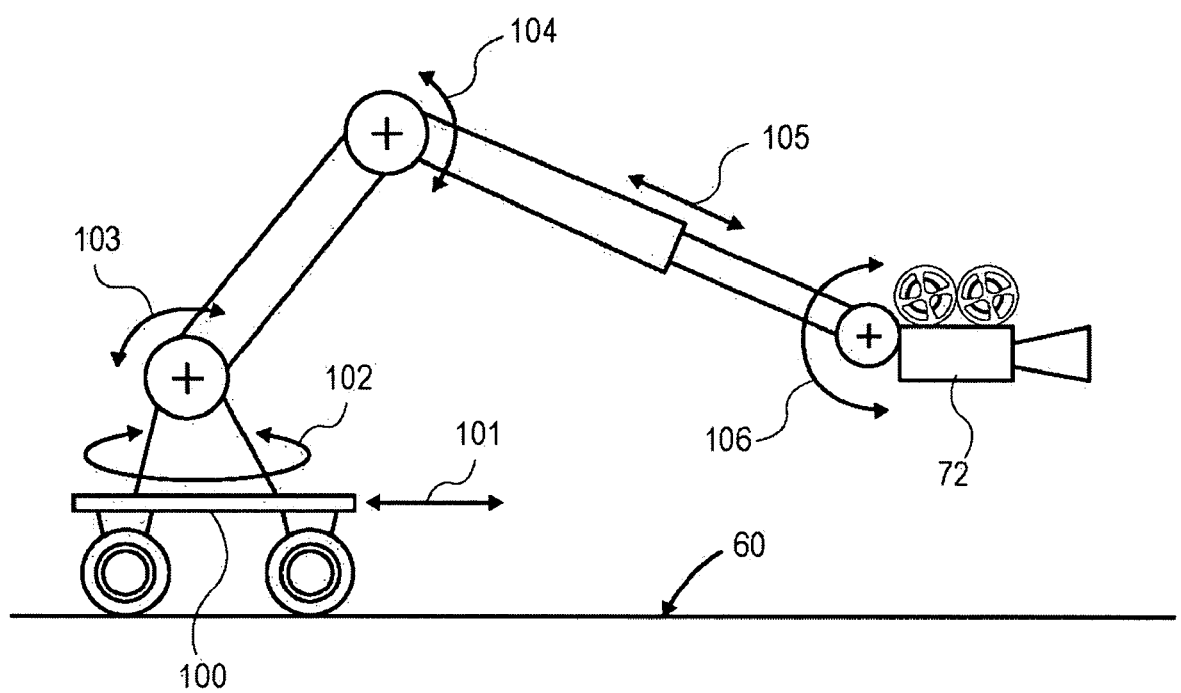
FIG. 5 is a depiction of a crane axes coordinate system illustrating camera movement relative to such a coordinate system.

Referring to FIG. 5, we have a so-called "crane axis" configuration. Simply stated, for the conventional movie or television camera operator, this is welcome home ground. Motorized cart 100 moves along direction 101 (cart steering is presumed). Rotation of the crane relative to the cart occurs about rotational axis 102. Crane articulation occurs at crane joints 103, 104, with towards and away camera booming occurring at 105. Finally, upward and downward camera panning occurs about rotation axes 106 to corresponding pan camera 72 relative to scene 60 from that particular position in which it is located.

The motion of FIG. 5 is relatively complicated. However, many operators think with facility given the degrees of motion illustrated. It is the ability to switch to at least some—if not all of the degrees motion that renders this system useful.

Figure 6:
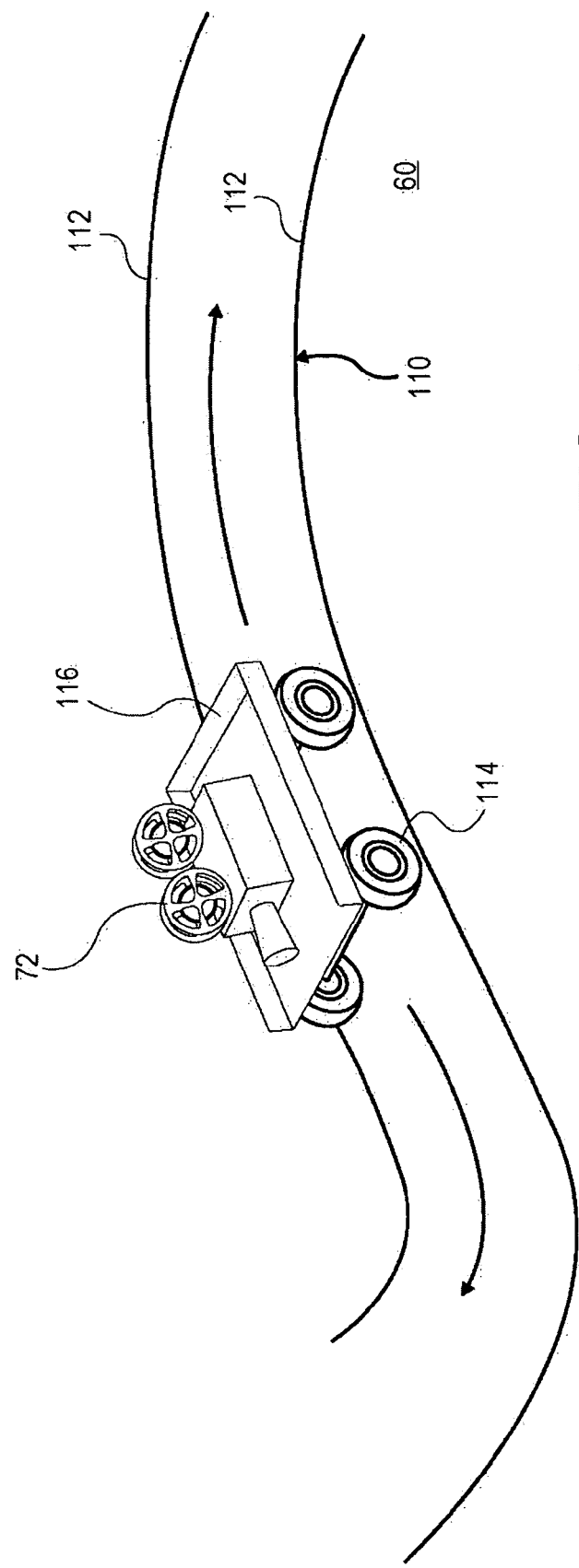
FIG. 6 is a depiction of a motorized track control system illustrating camera movement undertaken by such a system.

Referring to FIG. 6, this situation of the motorized track 110 on a scene 60 can be considered. Simply stated, rails 112 are followed by wheels 114 from motorized cart 116 to propel camera 72 along the track. It will be understood that the apparatus of FIG. 5 could be added to the motorized track. An example of such practical use of a motorized track could be a "stage coach" scene in a Western movie. The camera operator will follow the relatively complex and non-linear movement along the track without consideration to the direction of cart 116 movement; the cameraman can concentrate on all the relatively other complex movement that may be required, for example the movement of the crane structure previously illustrated in FIG. 5.

The panning of camera 72 can be superimposed in part or in whole on the motions previously illustrated with respect to FIGS. 3 through 6.

Figure 7A:
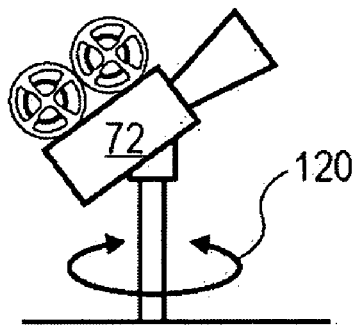
FIG. 7A-7D are depictions of rotation coordinate systems illustrating camera movement undertaken by such systems.

Referring to FIG. 7A, a level pan of a camera 72 is illustrated about level rotational axis 120. This level panning occurs although the camera is pointed at an angle upwardly.

Figure 7B:
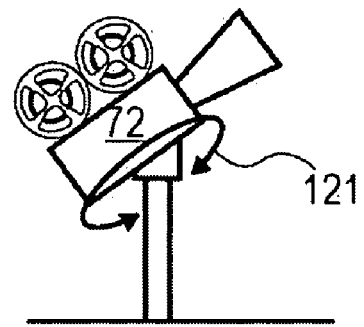
Figure 7C:
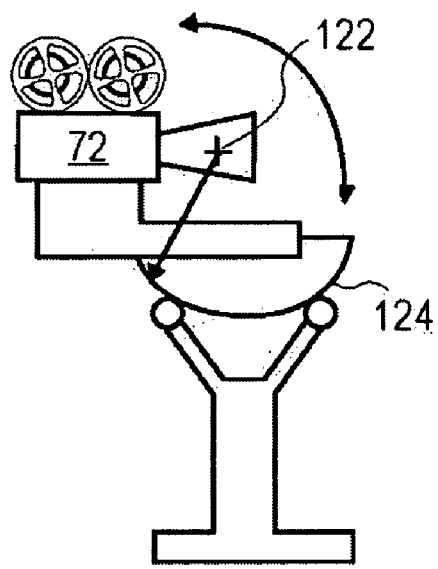
Figure 7D:
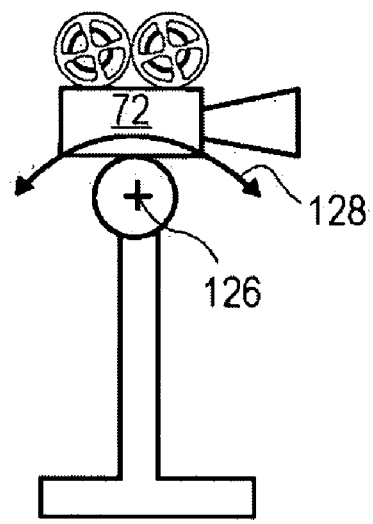

Referring to FIG. 7B, rotational axis 121 is about the angle of upward tilt of the camera. Referring to FIG. 7C, a nodal tilt is provided with the camera rotating about lens point 122 on rotation apparatus 124. Finally, in FIG. 7D, a conventional tilt is illustrated with camera tilt occurring about mount axis 126 along axes 128. Other examples are endlessly possible.

Figure 8A:
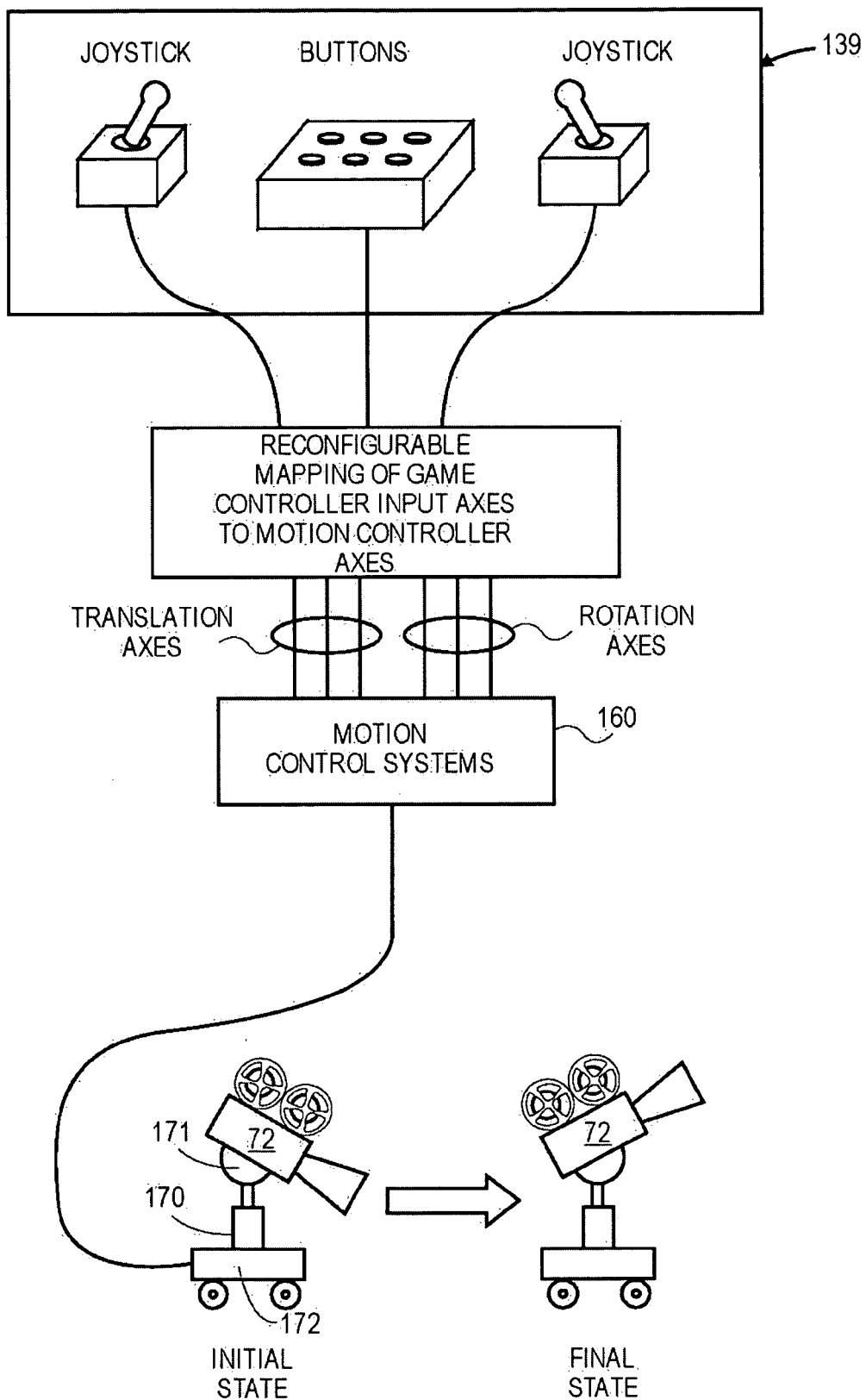
FIG. 8A is a schematic illustration of a control system supporting multiple coordinate and control systems in accordance with various embodiments of the invention.

As described in further detail below, embodiments of the invention can comprise a variety of controllers for controlling the movement of an object. Such controllers can include, among others, a mouse, a keyboard, a joystick, a steering wheel (or other vehicle control device), a full- or partial-body motion capture device (such as those described above, and including without limitation any optical, mechanical and/or electromagnetic system configured to capture the position or motion of an actor, puppet and/or prop), an inertial control system, an optical control system, and/or the like. Merely by way of example, FIGS. 8A and 8B illustrate a controller 139 in which the mechanical position of joystick actuator 137 is converted into an electrical signal which is ultimately used to control the motion of one or more axes of a motion control system (also referred to as a "movement system") in a user-configurable manner.

Figure 8B:
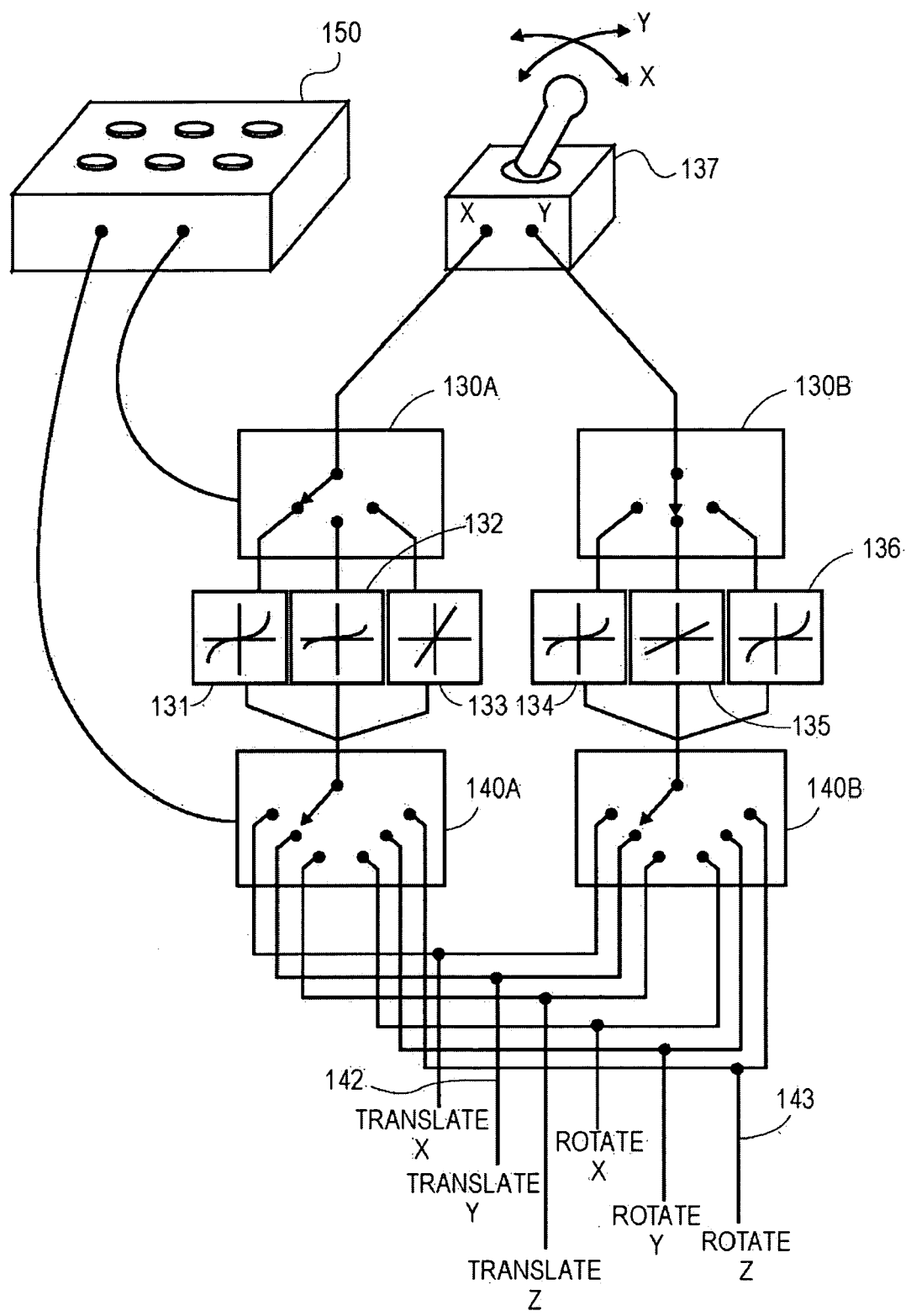
FIG. 8B is a detailed drawing illustrating the adaptation of the system of FIG. 8A to multiple coordinate systems, in accordance with various embodiments of the invention.

Referring to FIG. 8B, two selectors, responsivity selector 130A and 130B and axis selector 140A and 140B are under the control of control buttons 150. Control buttons 150 might also provide functionality to define an auxiliary coordinate system and/or to toggle between a reference coordinate system and one or more auxiliary coordinate systems, as described elsewhere herein.

Responsivity selectors 130A and 130B selects a specific responsivity function 131-133, 134-136 from a set of available responsivity functions. Responsivity function 131-133, 134-136 are used to modify the signal coming from the Joystick to match the responsivity desired by the user. For example, the user may wish to have a "dead zone" in the response of the system where small accidental motions of the joystick actuator 137 away from the centered position are ignored by the system. To obtain a "dead zone," the user would select a responsivity function which results in a zero output value for some range of input values. The user may also wish to have a "non-linear" response function, whereby small displacements of the joystick actuator 137 away from the centered position result in small output values, but large displacements of the joystick actuator 137 result in a disproportionately large output value so as to provide a greater (or lesser) dynamic range of output values than would be expected from the behavior of the system near the centered position.

Axis selectors 140A and 140B assign the effect of moving joystick actuator 137 in a certain direction (here labeled X or Y) to an operator specified motion control axis. As shown in the figure, motion of the joystick actuator 137 along the X Axis is assigned by axis selector 140A to the translate Y motion control axis 142. In the same manner, motion of the joystick actuator 137 along the Y Axis is shown as being assigned to the rotate Z motion control axis 143. Hence, a user input (motion of the joystick actuator) can be translated from an auxiliary coordinate system (defined by X and Y translational axes, in this case), to a reference coordinate system (defined by Y translation axis and Z rotation axis, in this case).

FIG. 8A illustrates a controller 139 comprising actuators 137 and 138 may be used to control the motion of a camera 72 (and/or a motion control system 160 responsible for moving the camera) in a reconfigurable manner. Specifically, motion control system 160 is specialized as to the particular type of motion control which the camera in fact has. Here, we have camera 72 mounted on a cart 172 with elevation piston 170 and rotational mechanism 171. Although these do not change as the type of control changes, the response elicited does in fact change dependant upon the control function 131-133, 134-136 that is being utilized.

Figure 9:
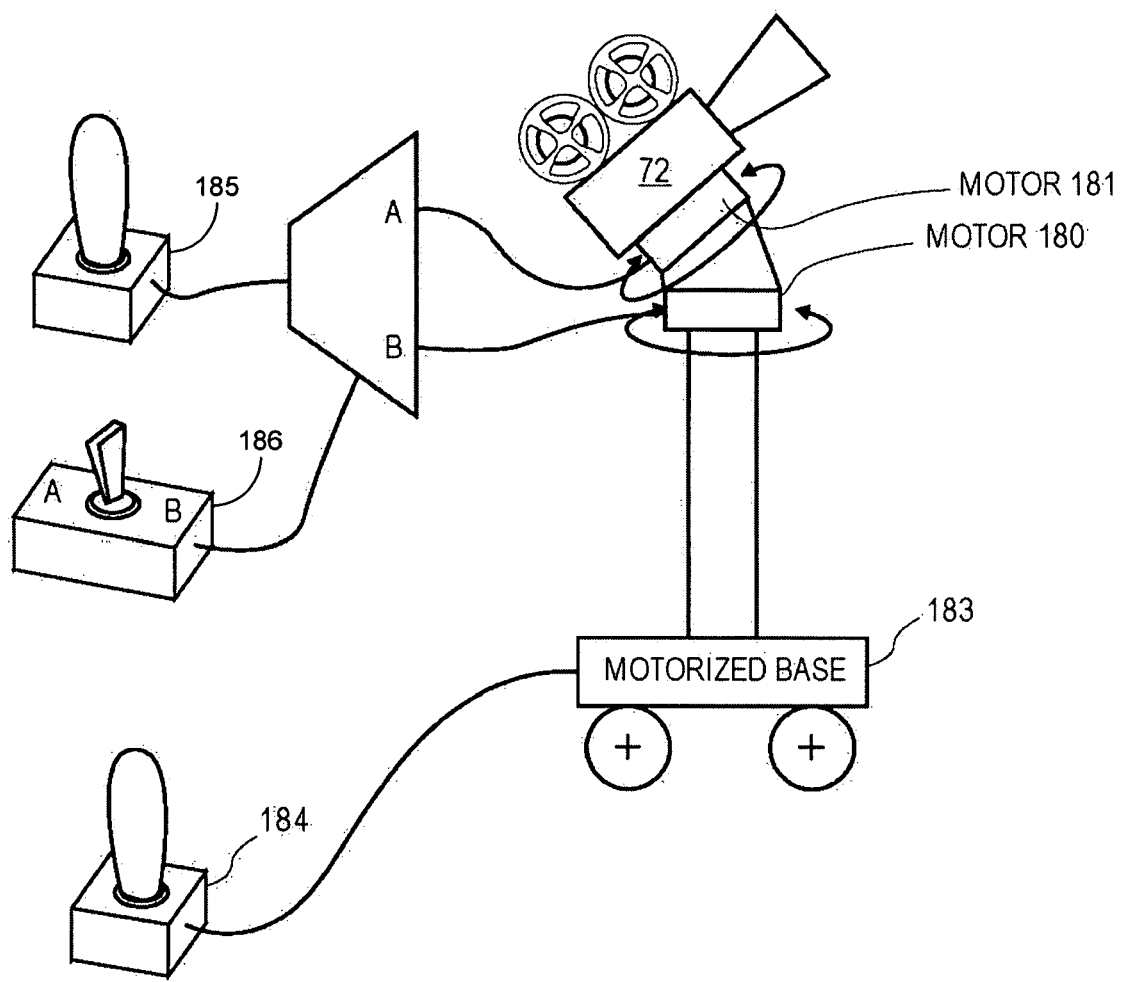
FIG. 9 illustrates a system supporting separately configured controller axes between coordinate systems while leaving the other axes unchanged, in accordance with various embodiments of the invention.

FIG. 9 sets forth a less generalized and simpler embodiment. Specifically, camera 72 is panned at an upward angle. Joystick 185 can control rotation about horizontal axis 180 and canted axis 181, which is here shown to be coincident to the pan angle of camera 72, perhaps based upon a selection by switch 186. Motorized base 183 is conventionally controlled by joystick 184. In this case, joystick 184 might be configured to provide instructions the motorized base 183 according to a reference coordinate system (such as an object relative coordinate system, in which the a forward input to the joystick 184 would cause the base 183 to move forward, regardless of the orientation (according to a world coordinate system, for example) of the base 183). Optionally, joystick 184 might have one or more additional controls (not shown) configured to allow the operator to define an auxiliary coordinate system, such that input to the joystick 184 would be described by the auxiliary coordinate system, which would be translated to instructions described by the reference coordinate system for moving the base 183).

Figure 10:
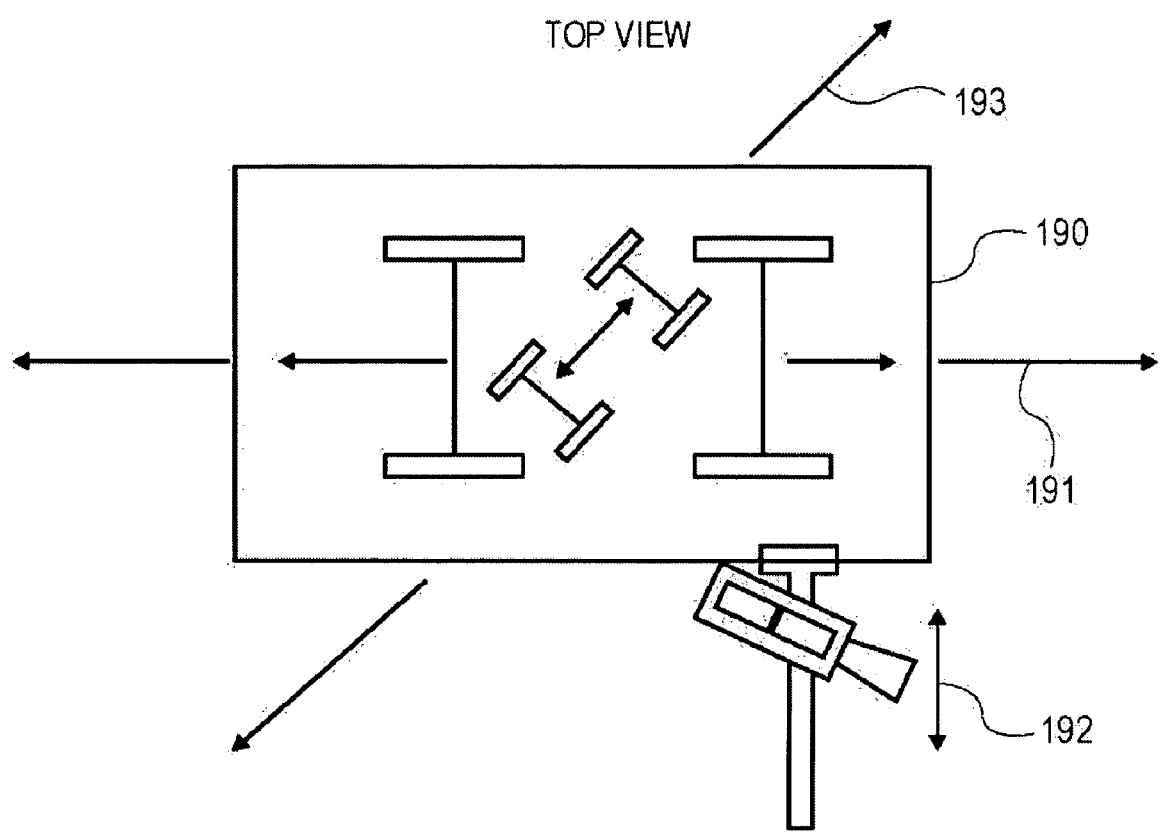
FIG. 10 illustrates a system supporting the configuration of a set of control axes that independently of other control axes, in accordance with various embodiments of the invention.

FIG. 10 is yet another embodiment, this time illustrated at the motorized cart 190 which has "normal movement" along conventional X-axis 191 with camera movement occurring along Y-axis 192. Here, cart movement can be altered with a new X-axis 193 only. For example, if in the corner of a set a particular "towards and away movement" is desired, cart movement can be based on the alternately selected X-axis 193—say towards and away from a door in the corner of the set.

In some cases, logic for interpreting input as being described by to a particular coordinate system (such as a reference coordinate system and/or an auxiliary coordinate system), as well as logic for translating input (if necessary) into instructions described by a reference coordinate system may be provided by hardware, firmware and/or software within the controller. In other cases, a processor (which might be within the controller and/or within a computer providing communication between the controller and the movement system) may have instructions for performing such operations.

Figure 11:
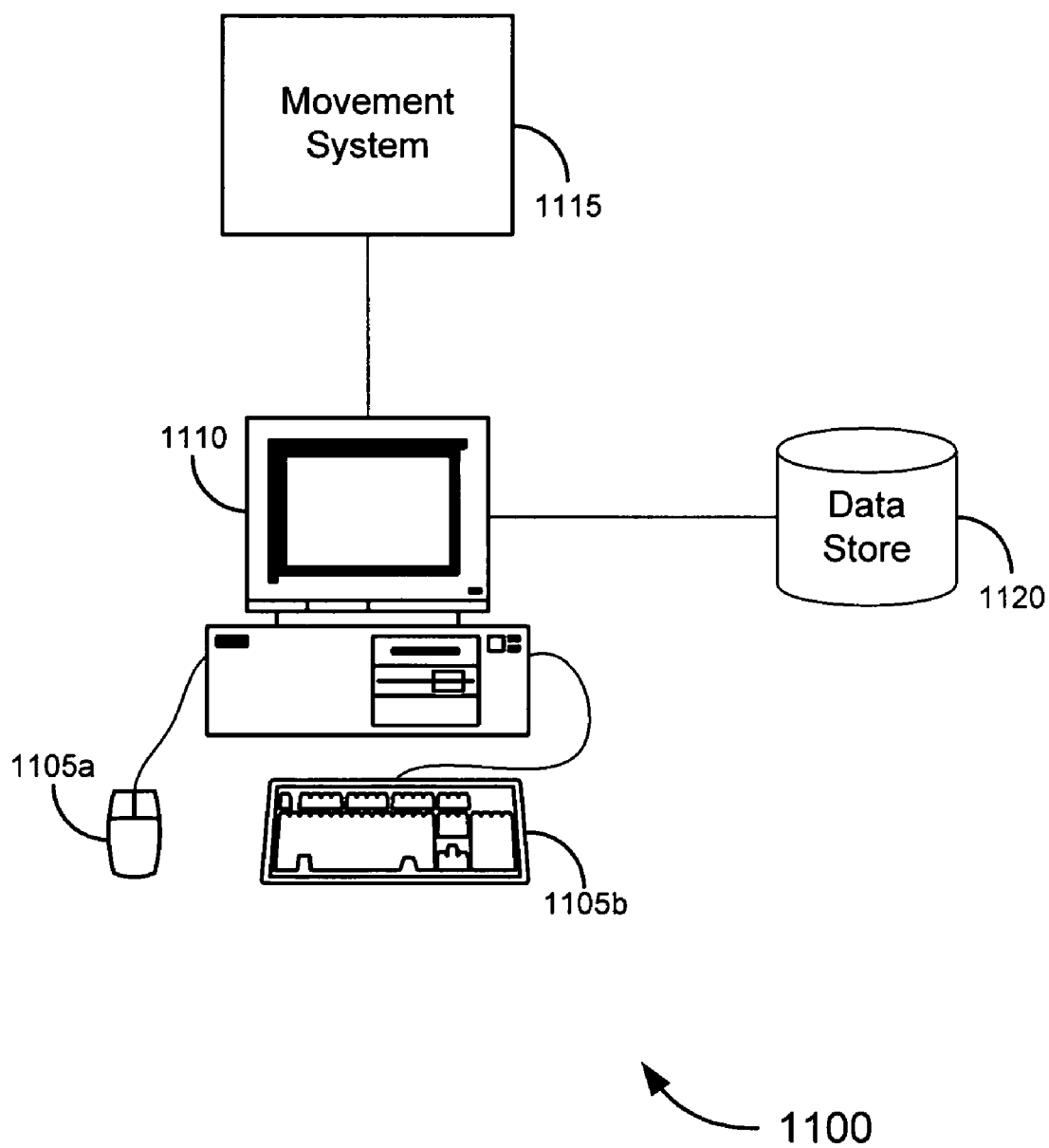
FIG. 11 illustrates a computer system that can be used to move objects, in accordance with various embodiments of the invention.

Merely by way of example, FIG. 11 illustrates a system 1100 in which a controller 1105 (in this case, a mouse 1105a and keyboard 1105b) is in communication with a computer 1110, which, in turn, is in communication with a movement system 1115. The controller accepts input (e.g., via manipulation of the mouse and/or keystrokes) and provides that input to the computer 1110. The computer receives the input and determines, based on a configuration, which coordinate system is in use. As necessary the computer translates the input into instructions, described by a reference coordinate system, and provides those instructions to the movement system 1115. Certain input, such as a particular keystroke, mouse button input, etc. can be interpreted by the computer as defining an auxiliary coordinate system and/or as toggling the configuration between the reference coordinate system and one or more auxiliary coordinate systems (which may or may not have been defined by the user).

The movement system can be physical or virtual. Merely by way of example, a physical movement system could be responsible for moving a camera, a light, a vehicle, a camera platform (including, merely by way of example, a flying camera platform) or some other tool (which might be a film-making tool or any other appropriate type of tool, vehicle, etc. (including without limitation manufacturing, construction, repair, forestry, and/or mining tools and vehicles, etc.). A virtual movement system might effectuate the movement, within a virtual scene, of an animated character, virtual camera, virtual light source, and/or any other appropriate object.

In a set of embodiments, the system 1100 can include a data store 1120, which can comprise any suitable storage medium (including without limitation RAM, hard disk drives, etc.) which can be used to record actuator movement, object movement, various coordinate systems (including auxiliary coordinate systems defined by the user) and the like. In this way, for example, a defined auxiliary coordinate system can be used at a later time. Similarly, actuator movements (an/or, in some cases, the inputs based on such movements) and/or object movements (and/or, in some cases, instructions producing those movements) can be replayed at a later time.

Figure 12:
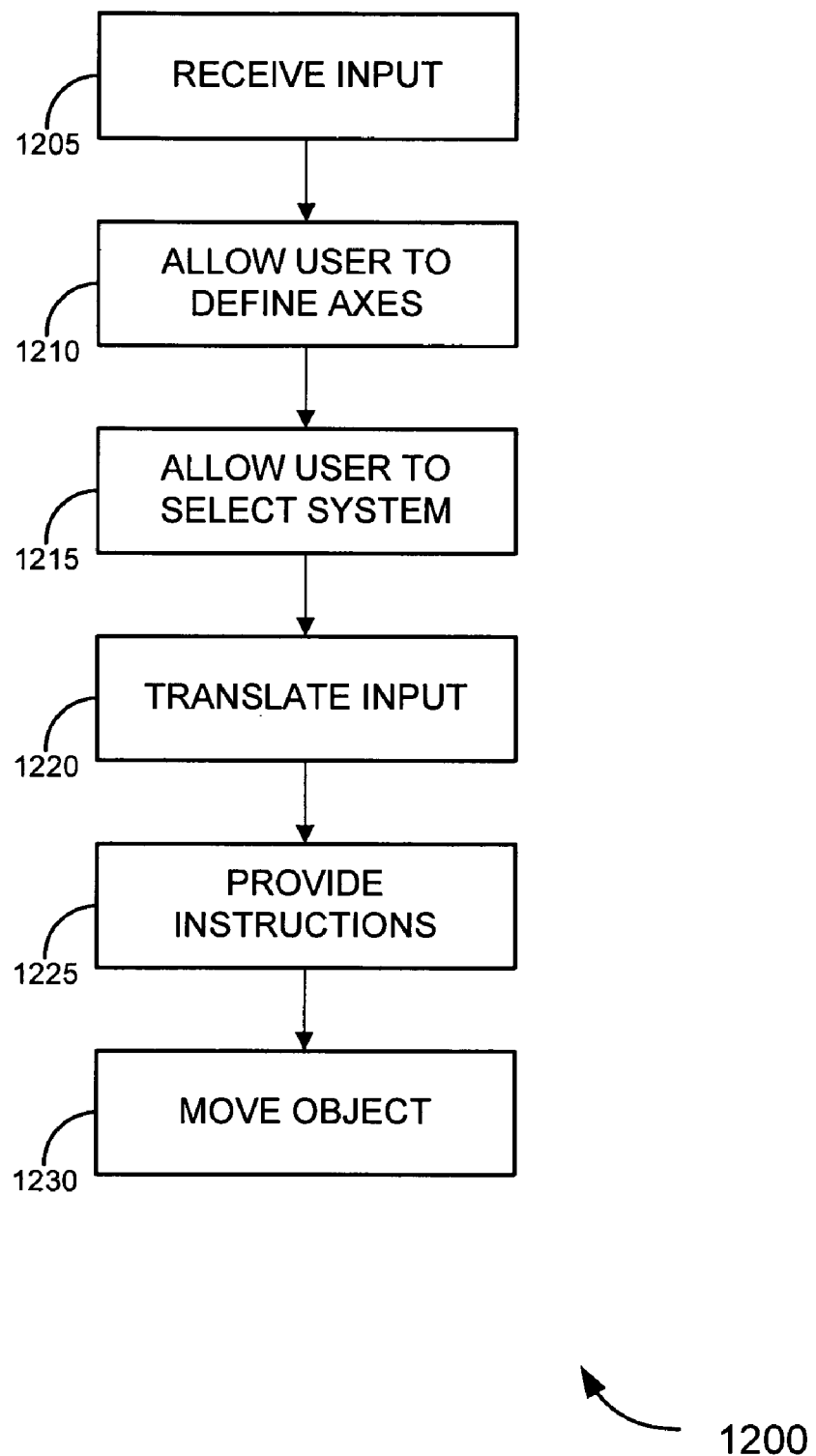
FIG. 12 is a flow diagram illustrating a method of moving an object using a controller, in accordance with various embodiments of the invention.

Another set of embodiments provides methods of using such controllers and/or of controlling the movement of an object. An exemplary method 1200 is illustrated by FIG. 12. The method 1200 comprises receiving (e.g., via a controller) input from a user (block 1205) indicating a desired movement of an object (which can be any of the objects described above). In some cases, the method 1200 further comprises allowing a user to define an auxiliary coordinate system (block 1210) (e.g., as described above), for example, by defining a set of axes defining the coordinate system. In some embodiments, the coordinate system can be defined even while the object is already moving. As noted above, in some cases, a control can be provided on a controller to allow the user to define the auxiliary coordinate system, perhaps in relation to a current position and/or alignment of the object.

In other embodiments, the method 1200 can include allowing the user to select between various coordinate systems (block 1215) (e.g., by toggling between a reference coordinate system and an auxiliary coordinate system, which might be one of a plurality of defined auxiliary coordinate systems). In this way, when the user selects the reference coordinate system, the input is described according to the reference coordinate system, while when the user selects an auxiliary coordinate system, the input is described according to that auxiliary coordinate system. Once again, a button might be provided on the controller to allow this functionality.

In some cases, it may be necessary to translate the input received from the user (block 1220). For instance, if the controller is configured to accept input described according to an auxiliary coordinate system, and the movement system is configured to accept instructions according to the reference coordinate system, the input is translated from the auxiliary coordinate system to the reference coordinate system. Based on the user input (perhaps translated), instructions for moving the object can be given to the movement system (block 1225). In some embodiments, then, the movement system moves the object (block 1230). Once again, it should be noted that the object (and thus the movement) can be virtual and/or real.

In light of the above disclosure, one skilled in the art will understand that the translations and/or transformations between various coordinate systems are essentially infinite in variety. As a practical and conventional matter, in applying this invention to the more usual case of animation, the differing modes of movement may be selected from a finite group. This group will include, without limitation, world relative coordinates, object relative coordinates, crane axes relative coordinates, motorized track relative coordinates, and rotation system coordinates. It should be apparent, that other, more specialized coordinate systems can be added as required.

Further, while the invention has been described with respect to exemplary embodiments, one skilled in the art will recognize that numerous modifications are possible. For example, the processes described herein may be implemented using hardware components, software components, and/or any combination thereof. Thus, although the invention has been described with respect to exemplary embodiments, it will be appreciated that the invention is intended to cover all modifications and equivalents within the scope of the following claims.

What is claimed is:

1. A control system for a mechanical, electronic or virtual digital system, wherein the control system controls at least a location of an object in a two-dimensional surface or three-dimensional space based on human user input specifying movement according to a coordinate system, the control system comprising:
   user inputs for receiving location changes specified according to a first coordinate system;
   a movement system configured to move the object according to the location changes specified in the first coordinate system;
   user inputs for changing from the first coordinate system to a second coordinate system;
   logic for operating the movement system in the second coordinate system when the user inputs specify a change in coordinate systems; and
   user inputs for specifying one or more conversions between the first and second coordinate systems;
   wherein the object is selected from the group consisting of a camera, a light, a character, a prop, a manned vehicle, an unmanned vehicle and a flying camera platform.

2. A control system as recited by claim 1, wherein the user inputs specify location changes in a current coordinate system, selected among the first and second coordinate systems, according to a coordinate system input, and wherein the user inputs include dimensional subcomponents such that each subcomponent allows a user to independently specify movement along an independent axis of the current coordinate system.

3. A system for moving an object, the system comprising:
   a controller configured to receive input from a user and, based on the received input, provide instructions to a movement system for moving a first object relative to at least one other object within a scene, wherein the input is described according to an auxiliary coordinate system;
   a movement system configured to move the first object according to the instructions; and
   logic to allow the user of the controller to define a set of controller axes defining the auxiliary coordinate system, and to translate the input from the auxiliary coordinate system to the reference coordinate system before providing the input as instructions to the movement system according to a reference coordinate system;
   wherein the first object is selected from the group consisting of a camera, a light, a character, a prop, a manned vehicle, an unmanned vehicle and a flying camera platform.

4. A system as recited by claim 3, wherein moving the first object relative to at least one other object within a scene comprises changing an orientation of the object.

5. A system as recited by claim 3, wherein the logic further allows the user of the controller to define a second set of controller axes defining a second auxiliary coordinate system.

6. A system as recited by claim 3, wherein the logic further allows the user of the controller to toggle between the reference coordinate system and the auxiliary coordinate system.

7. A system as recited by claim 6, wherein the controller comprises a control to enable the user to define the set of controller axes.

8. A system as recited by claim 3, wherein the set of controller axes are defined by a current orientation of the object.

9. A system as recited by claim 3, wherein the logic allows the user of the controller to define the set of axes while the first object is moving.

10. A system as recited by claim 3, wherein the auxiliary coordinate system is selected from the group consisting of world relative coordinates, object relative coordinates, crane axes relative coordinates, motorized track relative coordinates, and rotation system coordinates.

11. A system as recited by claim 3, wherein the reference coordinate system is selected from the group consisting of world relative coordinates, object relative coordinates, crane axes relative coordinates, motorized track relative coordinates, and rotation system coordinates.

12. A system as recited by claim 3, wherein the first object is real.

13. A system as recited by claim 3, wherein the first object is virtual, such that the movement of the first object within the scene is also virtual.

14. A system as recited by claim 3, wherein the first object is an optical transceiver.

15. A system as recited by claim 3, wherein:
   the set of controller axes is a first set of controller axes defining the auxiliary coordinate system; and
   the reference coordinate system comprises a second set of controller axes defining the reference coordinate system.

16. A system as recited by claim 15, wherein at least one controller axis describes an arbitrary mathematical functions of space and/or space and time.

17. A system as recited by claim 15, wherein at least one controller axis is a rotational axis.

18. A system as recited by claim 15, wherein at least one axis in the first set of controller axes and at least one axis in the second set of controller axes share a common arbitrary mathematical function of space and/or time.

19. A system as recited by claim 3, wherein the controller comprises at least one actuator.

20. A system as recited by claim 19, wherein the at least one actuator comprises a joystick.

21. A system as recited by claim 3, wherein the controller comprises at least one device selected from the group consisting of a game controller, a mouse, a keyboard, a steering wheel, an inertial control system, and an optical control system.

22. A system as recited by claim 3, further comprising:
a storage medium; and
logic for recording actuator movement to the storage medium for later playback.

23. A system as recited by claim 3, further comprising:
a storage medium; and
logic for recording object movement to the storage medium for later playback.

24. A system as recited by claim 3, further comprising:
a storage medium; and
logic for storing the auxiliary coordinate system to the storage medium.

25. A control system as recited by claim 1, wherein the object is virtual, such that the movement of the object within the scene is also virtual.

26. A system for moving an object, the system comprising:
a controller configured to receive input from a user and, based on the received input, provide instructions to a movement system for moving an optical transceiver relative to at least one other object within a scene, the optical transceiver projecting and/or receiving light along an axis, wherein the input is described according to an auxiliary coordinate system;
a movement system configured to move the optical transceiver according to the instructions; and
logic to allow the user of the controller to define a set of controller axes defining the auxiliary coordinate system, and to translate the input from the auxiliary coordinate system to the reference coordinate system before providing the input as instructions to the movement system according to a reference coordinate system;
wherein the controller is further configured to receive second input from the user, and based on the received second input, provide instructions to a second movement system for orienting a view of the optical transceiver; and
the system further comprises a second movement system configured to orient a view of the optical transceiver, subject to the second set of instructions from the controller.

27. A system as recited by claim 26, wherein the optical transceiver is selected from the group consisting of a virtual optical transceiver, a light, a camera, and a light projecting a beam symmetrical about an axis chosen relative to the optical transceiver.

28. A system as recited by claim 26, wherein:
the controller comprises a plurality of actuators comprising a first actuator and a second actuator;
the first actuator receives input related to a movement of the optical transceiver; and
the second actuator receives input related to an orientation of the optical transceiver.

29. A system for moving an object, comprising:
a controller configured to receive input from a user and, based on the received input, provide instructions to a movement system for moving a first object relative to at least one other object within a scene;
a movement system configured to move the first object according to the instructions;
logic to allow the user of the controller to toggle between a reference coordinate system and an auxiliary coordinate system, such that the user input is described according to either the reference coordinate system or the auxiliary coordinate system; and
logic to translate the input from the user as necessary from the auxiliary coordinate system to the reference coordinate system, such that the instructions are provided to the movement system according to the reference coordinate system;
wherein the first object is selected from the group consisting of a camera, a light, a character, a prop, a manned vehicle, an unmanned vehicle and a flying camera platform.

30. A system as recited by claim 29, wherein the logic allows the user of the controller to toggle between the reference coordinate system and the auxiliary coordinate system while the object is moving.

31. A system as recited by claim 29, wherein the logic further allows the user of the controller to define a set of controller axes defining the auxiliary coordinate system.

32. A system as recited by claim 29, wherein the logic further allows the user of the controller to toggle between the reference coordinate system and one or more of a plurality of auxiliary coordinate systems.

33. A system as recited by claim 29, wherein the controller comprises a control to enable the user to toggle between the reference coordinate system and the auxiliary coordinate system.

34. A system as recited by claim 29, wherein the first object is virtual, such that the movement of the first object within the scene is also virtual.

35. A method of moving an object, the method comprising:
receiving at a controller input from a user for moving a first object relative to at least one other object within a scene, wherein the input is described according to an auxiliary coordinate system;
allowing the user of the controller to define a set of controller axes defining the auxiliary coordinate system;
translating the input from the auxiliary coordinate system to a reference coordinate system; and
providing instructions to a movement system for moving the first object, based on the translated input received from the user, wherein the instructions are described according to the reference coordinate system;
wherein the first object is selected from the group consisting of a camera, a light, a character, a prop, a manned vehicle, an unmanned vehicle and a flying camera platform.

36. A method as recited by claim 35, further comprising:
moving the first object based on the instructions.

37. A method as recited by claim 35, further comprising:
allowing the user to toggle between the reference coordinate system and the auxiliary coordinate system.

38. A method as recited by claim 35, wherein the first object is virtual, such that the movement of the first object within the scene is also virtual.

39. A method of moving an object, the method comprising:
receiving at a controller input from a user for moving a first object relative to at least one other object within a scene;
allowing the user of the controller to toggle between a reference coordinate system and an auxiliary coordinate system, such that when the user selects the reference coordinate system, the input is described according to the reference coordinate system, and when the user selects the auxiliary coordinate system, the input is described according to the auxiliary coordinate system;
if necessary, translating the input received from the user from the auxiliary coordinate system to the reference coordinate system; and
providing instructions to a movement system for moving the first object, based on the input received from the user, wherein the instructions are described according to the reference coordinate system;
wherein the first object is selected from the group consisting of a camera, a light, a character, a prop, a manned vehicle, an unmanned vehicle and a flying camera platform.

40. A method as recited by claim 39, wherein the first object is virtual, such that the movement of the first object within the scene is also virtual.

41. A system for moving an object, the system comprising:
a controller configured to receive input from a user to move a first object relative to at least one other object within a scene, wherein the input is described according to an auxiliary coordinate system, and wherein the first object is selected from the group consisting of a camera, a light, a character, a prop, a manned vehicle, an unmanned vehicle and a flying camera platform;
a movement system configured to move the first object according to movement instructions received from a computer; and
a computer in communication with the controller and the movement system, the computer comprising a processor and a set instructions, the set of instructions comprising:
a) instructions executable by the processor to receive the input from the controller;
b) instructions executable by the processor to allow the user to define a set of controller axes defining the auxiliary coordinate system;
c) instructions to translate the input from the auxiliary coordinate system to the reference coordinate system; and
d) instructions based on the received input, provide movement instructions to a movement system, wherein the movement instructions are described according to the reference coordinate system.

42. A system as recited by claim 41, wherein the first object is virtual, such that the movement of the first object within the scene is also virtual.

43. A method of moving an object, the method comprising:
receiving at a controller input from a user for moving an optical transceiver relative to at least one other object within a scene, the optical transceiver projecting and/or receiving light along an axis, wherein the input is described according to an auxiliary coordinate system;
allowing the user of the controller to define a set of controller axes defining the auxiliary coordinate system;
translating the input from the auxiliary coordinate system to a reference coordinate system; and
providing instructions to a movement system for moving the optical transceiver, based on the translated input received from the user, wherein the instructions are described according to the reference coordinate system;
receiving, at the controller, second input from the user; and
based on the second input, providing instructions to a second movement system for orienting a view of the optical transceiver.

44. A method as recited by claim 43, wherein the optical transceiver is selected from the group consisting of a virtual optical transceiver, a light, a camera, and a light projecting a beam symmetrical about an axis chosen relative to the optical transceiver.

45. A method of moving an object, the method comprising:
receiving at a controller input from a user for moving an optical transceiver relative to at least one other object within a scene, the optical transceiver projecting and/or receiving light along an axis;
allowing the user of the controller to toggle between a reference coordinate system and an auxiliary coordinate system, such that when the user selects the reference coordinate system, the input is described according to the reference coordinate system, and when the user selects the auxiliary coordinate system, the input is described according to the auxiliary coordinate system;
if necessary, translating the input received from the user from the auxiliary coordinate system to the reference coordinate system; and
providing instructions to a movement system for moving the optical transceiver, based on the input received from the user, wherein the instructions are described according to the reference coordinate system;
receiving, at the controller, second input from the user; and
based on the second input, providing instructions to a second movement system for orienting a view of the optical transceiver.

46. A method as recited by claim 45, wherein the optical transceiver is selected from the group consisting of a virtual optical transceiver, a light, a camera, and a light projecting a beam symmetrical about an axis chosen relative to the optical transceiver.

* * * * *